United States Patent
Kato

(10) Patent No.: US 8,237,959 B2
(45) Date of Patent: Aug. 7, 2012

(54) COMMUNICATION APPARATUS

(75) Inventor: Tokunori Kato, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1171 days.

(21) Appl. No.: 12/053,571

(22) Filed: Mar. 22, 2008

(65) Prior Publication Data

US 2008/0244351 A1   Oct. 2, 2008

(30) Foreign Application Priority Data

Mar. 29, 2007   (JP) ................. 2007-088655

(51) Int. Cl.
- G06F 3/12 (2006.01)
- G06K 15/00 (2006.01)
- H04N 1/00 (2006.01)

(52) U.S. Cl. ....... 358/1.15; 358/402; 358/405; 358/437; 358/1.16; 379/100.05; 379/100.06

(58) Field of Classification Search .................. None
See application file for complete search history.

(56) References Cited

U.S. PATENT DOCUMENTS

| | | | |
|---|---|---|---|
| 6,442,252 B1 | 8/2002 | Fujise et al. | |
| 6,785,017 B1* | 8/2004 | Yoshiura | 358/1.15 |
| 6,827,279 B2 | 12/2004 | Teraura | |
| 7,027,176 B2* | 4/2006 | Tanimoto | 358/1.15 |
| 2001/0029595 A1* | 10/2001 | Murata | 714/746 |
| 2002/0171876 A1* | 11/2002 | Yoshida | 358/400 |
| 2004/0114194 A1* | 6/2004 | Eguchi et al. | 358/400 |
| 2006/0013244 A1* | 1/2006 | Yamamoto | 370/432 |
| 2006/0092024 A1* | 5/2006 | Kim et al. | 340/572.1 |
| 2006/0098901 A1* | 5/2006 | Hino | 382/306 |
| 2006/0109503 A1* | 5/2006 | Hong | 358/1.15 |
| 2006/0126095 A1* | 6/2006 | Tamura et al. | 358/1.14 |
| 2006/0215228 A1* | 9/2006 | Inaba | 358/3.28 |
| 2007/0091343 A1* | 4/2007 | Morita | 358/1.13 |
| 2007/0253022 A1* | 11/2007 | Oshima | 358/1.15 |
| 2008/0111660 A1* | 5/2008 | Kim et al. | 340/5.86 |
| 2008/0204802 A1* | 8/2008 | Tanimoto | 358/1.15 |
| 2008/0204817 A1* | 8/2008 | Nakano | 358/435 |
| 2008/0204818 A1* | 8/2008 | Nakano | 358/437 |
| 2008/0239406 A1* | 10/2008 | Nakano | 358/401 |
| 2008/0239408 A1* | 10/2008 | Urakawa | 358/435 |

FOREIGN PATENT DOCUMENTS

JP   H06-311274 A   11/1994

(Continued)

OTHER PUBLICATIONS

Japan Patent Office; Notification of Reason for Refusal in Japanese Patent Application No. 2007-088655 (counterpart to the above-captioned U.S. patent application) mailed Apr. 14, 2009.

*Primary Examiner* — Satwant Singh
(74) *Attorney, Agent, or Firm* — Baker Botts L.L.P.

(57) ABSTRACT

A communication apparatus is provided. The communication apparatus includes an image read unit which reads image data from a transmission document; a tag read unit which wirelessly reads tag data stored in a wireless tag corresponding to the transmission document; an image data generation unit, if the tag data includes mark data indicating that a mark is to be added to the image data, generates composite image data by combining the image data and mark image data based on the mark data; and a transmission unit which transmits the composite image data as transmission document data to an external apparatus.

16 Claims, 13 Drawing Sheets

FOREIGN PATENT DOCUMENTS

| | | |
|---|---|---|
| JP | H08-265552 A | 10/1996 |
| JP | H11-177728 A | 7/1999 |
| JP | 2002-337426 A | 11/2002 |
| JP | 2006-135444 A | 5/2006 |
| JP | 2007-006316 A | 1/2007 |
| JP | 2007-060220 A | 3/2007 |

* cited by examiner (b)

FIG. 5

| STORAGE AREA | STORAGE CONTENT | | | DATA SIZE (BYTES) |
|---|---|---|---|---|
| UNIQUE ID AREA | | | | 4 |
| SYSTEM AREA | | | | 60 |
| USER AREA | WATERMARK SETTING DATA | MARK PRESENSE / ABSENCE SETTING | | 2 |
| | | MARK SYNTHESIS SETTING | | |
| | | DATE LIMIT SETTING | | |
| | MARK COMPOSITION DATA | CHARACTER STRING | | 40 |
| | | FONT | | 1 |
| | | SIZE | | 1 |
| | | COLOR INFORMATION | | 2 |
| | | POSITION INFORMATION X | | 2 |
| | | POSITION INFORMATION Y | | 2 |
| | | ANGLE INFORMATION | | 1 |
| | | CODE TYPE | | 1 |
| | MARK ATTACHMENT START DATE AND TIME DATA | | | 4 |

(FIG.10 CONTINUED)
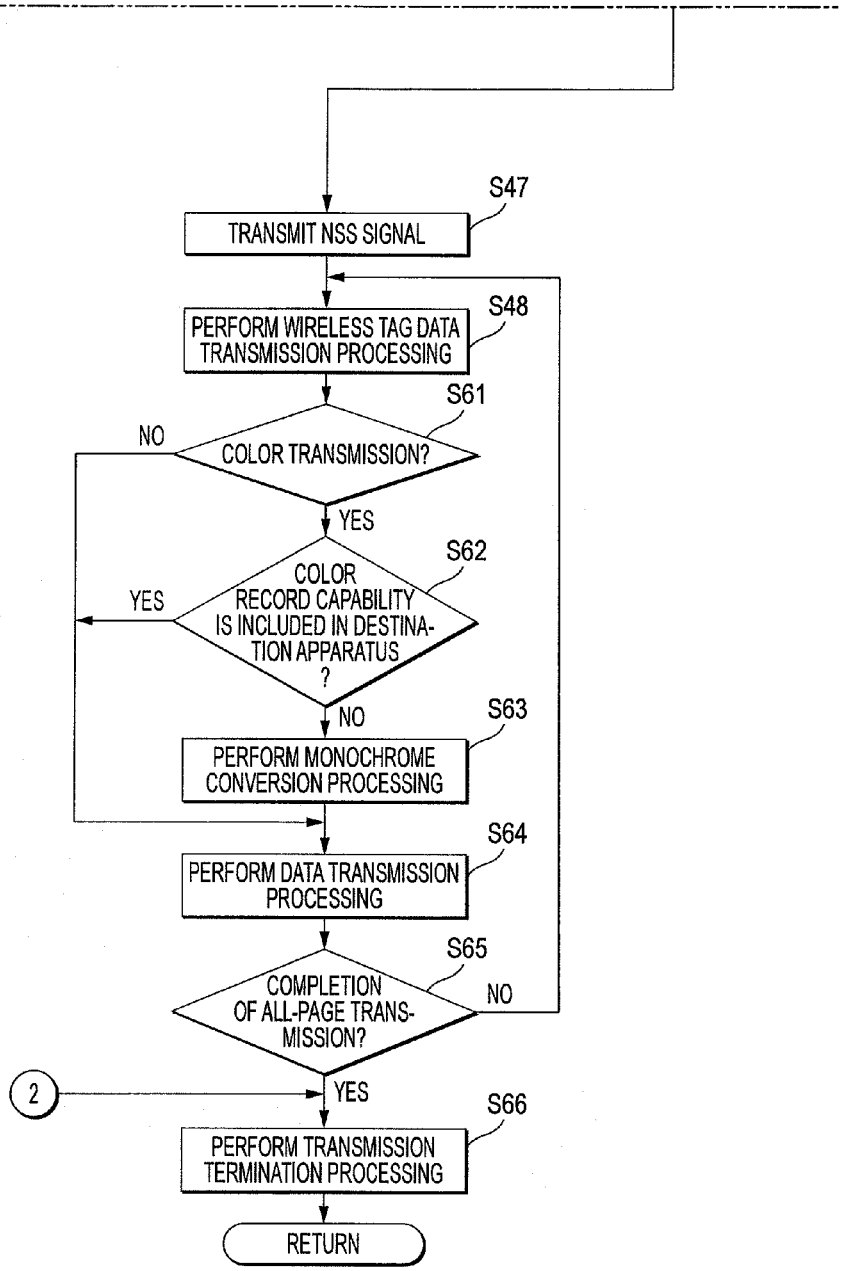

COMMUNICATION APPARATUS

CROSS-REFERENCE TO RELATED APPLICATION

This application claims priority from Japanese Patent Application No. 2007-088655, filed on Mar. 29, 2007, the entire subject matter of which is incorporated herein by reference.

TECHNICAL FIELD

Apparatuses consistent with the present invention relate to a communication apparatus capable of reading and transmitting and receiving image data and wireless tag data, and more particularly to a communication apparatus capable of adding a watermark, a stamp, or the like to image data of a document to be transmitted and received.

BACKGROUND

Related art facsimile machines have been proposed which add a header and a stamp to image data corresponding to a transmission original. For example, JP-A-8-265552 describes a digital copier which creates a header and a stamp based on input in a pen input unit provided to the digital copier, and transmits image data, to which the created desired header, stamp, and the like are added, to the destination with a facsimile function thereof. Accordingly, the image data to which the created header, stamp, and the like are added is recorded on a record sheet at the destination.

However, in the digital copier described in JP-8-265552, the user needs to create any desired header and mark with the pen input unit and thus would be unable to create the desired header or mark without using the digital copier. That is, to transmit image data to which any desired mark, etc., is added, the user must perform work of "creation of the mark, etc.," at the transmission time. This means that the digital copier imposes the work burden on the user when transmitting the image data to which the mark, etc., is added.

Since the work for creating a mark, etc., takes a long time, if the user creates a mark, etc., with the digital copier, facsimile transmission by other users may be left undone. Recently, related art apparatuses have been developed which enables the user to set the color and the position of the mark in detail. Accordingly, with an apparatus like the digital copier described in JP-A-8-265552, the creation of the mark, etc., takes further long time for the user to set the color, the position, etc., of the mark in detail. That is, the problem of the delay of facsimile transmission becomes more serious.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a communication apparatus capable of reading and transmitting and receiving image data and wireless tag data, and more particularly, a communication apparatus capable of reducing the work burden on the user at the facsimile transmission time and executing smooth facsimile transmission of other users if a mark, etc., is added to image data to be transmitted and received.

According to an exemplary embodiment of the present invention, there is provided a communication apparatus including: an image read unit which reads image data from a transmission document; a tag read unit which wirelessly reads tag data stored in a wireless tag corresponding to the transmission document; an image data generation unit, if the tag data includes mark data indicating that a mark is to be added to the image data, generates composite image data by combining the image data and mark image data based on the mark data; and a transmission unit which transmits the composite image data as transmission document data to an external apparatus.

According to another exemplary embodiment of the present invention, there is provided a communication apparatus including: an image read unit which reads image data from a transmission document; a tag read unit which wirelessly reads tag data stored in a wireless tag corresponding to the transmission document; and a transmission unit, if the tag data includes mark data indicating that a mark is to be added to the image data, transmits, as transmission document data, the image data and the tag data including the mark data to an external apparatus.

According to a further exemplary embodiment of the present invention, there is provided a communication apparatus including: a reception unit which receives reception data including tag data and image data form an external apparatus; a separation unit which separates the reception data into the tag data and the image data; an image data generation unit, if the tag data provided by the separation unit includes mark data indicating that a mark is to be added to the image data, generates composite image data by combining a mark image data based on the mark data and the image data; and an output unit which outputs the composite image data generated by the combining unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 5 is a schematic representation concerning the structure of wireless tag data;

DETAILED DESCRIPTION OF EXEMPLARY EMBODIMENTS OF THE PRESENT INVENTION

Figure 1:
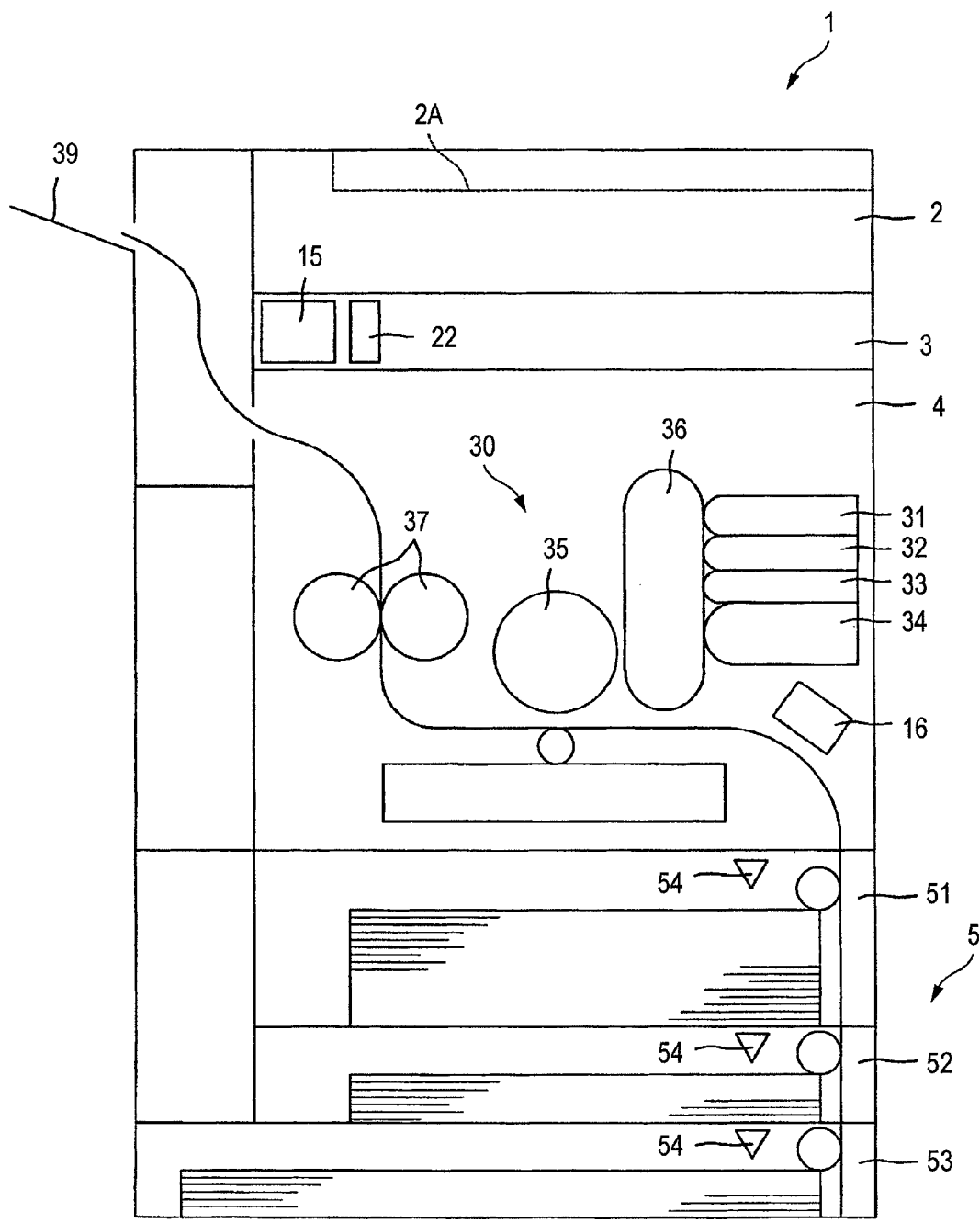
FIG. 1 is a schematic sectional view of a facsimile machine according to an exemplary embodiment of the present invention.

An exemplary embodiment of the present invention will now be described in detail with reference to the accompanying drawings. The exemplary embodiment will be described in relation to a facsimile machine. However, the present inventive concept also applies to other communication devices and multifunction devices that transmit and receive information to and from a destination. FIG. 1 is a schematic sectional view of a facsimile machine 1 according to an exemplary embodiment of the present invention.

As shown in FIG. 1, the facsimile machine 1 includes an automatic document feeder 2, a scanner unit 3, a printer unit 4, and a sheet feed tray unit 5.

The automatic document feeder 2 includes a document placement unit 2A. The document to be transmitted by facsimile is placed on the document placement unit 2A with the document face pointing downward. When a start key (not shown) is pressed, the document is sent one page at a time and the image data is read through the scanner unit 3. After the image data is read through the scanner unit 3, the document is discharged through a document discharge slot (not shown).

The scanner unit 3 includes a wireless tag reader 15 and a scanner 22. If a wireless tag is added to the document sent by the automatic document feeder 2, the wireless tag reader 15 wirelessly reads data from the wireless tag. The scanner 22 reads the image data of the document sent by the automatic document feeder 2 regardless of the presence or absence of a wireless tag.

The wireless tag mentioned herein denotes a record medium where data can be read and written in a non-contact manner, also called IC tag or Radio Frequency Identification (RFID) tag. The expression "wireless tag corresponding to a document" denotes a wireless tag put on a document or a wireless tag embedded in a document, for example.

The printer unit 4 has a wireless tag writer 16 and a laser printer 30. The wireless tag writer 16 writes data (wireless tag data described later or the like) to a wireless tag added to a record sheet fed from the sheet feed tray unit 5 in a wireless manner.

The laser printer 30 includes a Y station 31, an M station 32, a C station 33, and a K station 34. The Y station 31 stores yellow toner. Likewise, the M station 32 stores magenta toner, the C station 33 stores cyan toner, and the K station 34 stores black toner. The laser printer 30 also includes an intermediate transfer belt 36 for delivering the toner in each station to a transfer drum 35 and a fixing roller 37. A record sheet on which an image is formed by the laser printer 30 is discharged to a sheet discharge stacker 39.

The sheet feed tray unit 5 includes a first sheet feed tray 51, a second sheet feed tray 52, and a third sheet feed tray 53. A detection sensor 54 is disposed in each of the first sheet feed tray 51, the second sheet feed tray 52, and the third sheet feed tray 53. The detection sensor 54 detects the presence or absence of a wireless tag and the writable capacity of the wireless tag in each of record sheets stored in the corresponding sheet feed tray 51, 52, 53. The detection sensor 54 detects the writable capacity of the wireless tag added to one stacked record sheet.

Figure 2:
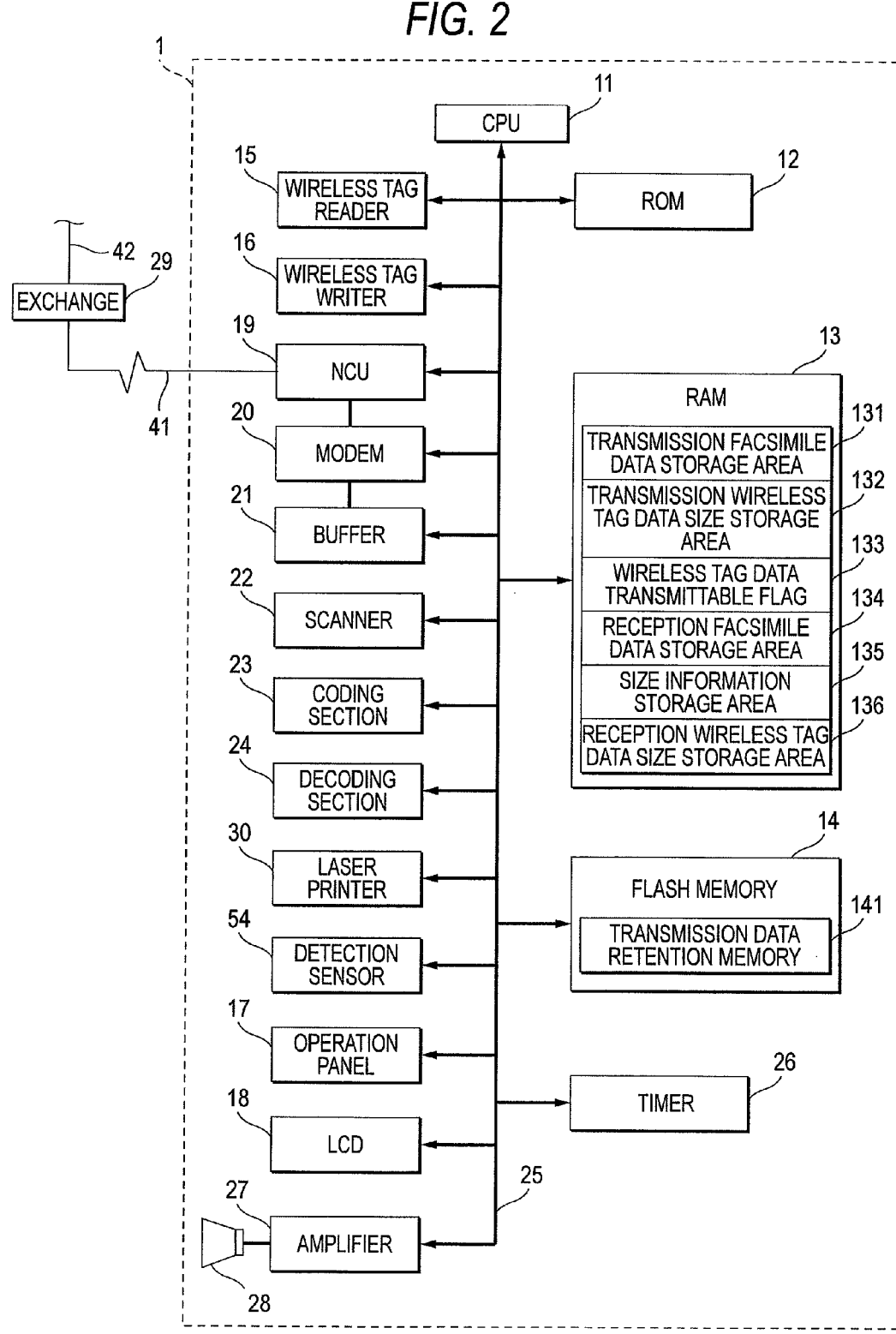
FIG. 2 is a block diagram to show the control system configuration of the facsimile machine.

Next, the control configuration of the facsimile machine 1 according to the exemplary embodiment will be discussed in detail with reference to the accompanying drawing. FIG. 2 is a block diagram to show the control configuration of the facsimile machine 1.

The facsimile machine 1 includes a central processing unit (CPU) 11, a read only memory (ROM) 12, a random access memory (RAM) 13, and a flash memory 14. The CPU 11, ROM 12, RAM 13, and flash memory are coupled through a bus line 25 together with various peripheral devices such as a network control unit (NCU) 19.

The CPU 11 of the facsimile machine 1 executes the facsimile operation, namely, data communications by controlling the components connected by the bus line 25 in accordance with various signals transmitted and received through the NCU 19 for performing line control. The ROM 12 is read-only memory storing control programs executed in the facsimile machine 1. The ROM 12 stores various control programs such as a fax transmission processing program described later with reference to FIG. 6 and a fax reception processing program described later with reference to FIG. 12.

The RAM 13 is memory for temporarily storing various pieces of data during execution of the operation of the facsimile machine 1. The RAM 13 includes a transmission facsimile data storage area 131, a transmission wireless tag data size storage area 132, a wireless tag data transmittable flag 133, a reception facsimile data storage area 134, a size information storage area 135, and a reception wireless tag data size storage area 136.

The transmission facsimile data storage area 131 stores facsimile data 63 including image data of a document read through the scanner 22 and wireless tag data read through the wireless tag reader 15. The configuration of the facsimile data 63 and the descriptions of the wireless tag data are described later in detail with reference to the accompanying drawings.

The transmission wireless tag data size storage area 132 stores the data size of the wireless tag data read through the wireless tag reader 15.

The wireless tag data transmittable flag 133 indicates whether or not a destination apparatus of facsimile transmission (see FIGS. 3A and 3B) has a function of writing data into a wireless tag. The facsimile machine 1 of the exemplary embodiment determines a transmission method in facsimile transmission processing based on the content in the wireless tag data transmittable flag 133. This is described later in detail with reference to the accompanying drawing.

The reception facsimile data storage area 134 stores the received facsimile data 63. The facsimile data 63 stored in the reception facsimile data storage area 134 is erased according to a fax reception processing program described later.

The size information storage area 135 stores size information sent from a transmitting facsimile machine. Size information indicating that no wireless tag data is included in the facsimile data 63 and size information indicating the data size of wireless tag data included in the facsimile data 63 exist as the size information sent from the transmitting facsimile machine.

The reception wireless tag data size storage area 136 stores the data size of the wireless tag data received from the transmitting facsimile machine of the facsimile data 63.

The flash memory 14 is rewritable nonvolatile memory. The flash memory includes a transmission data retention memory 141. If transmission of facsimile data to a destination apparatus 60 is prohibited (NO at S21), the image data read through the scanner 22 is stored in the transmission data retention memory 141 (S27). This is described later in detail with reference to the accompanying drawing.

As shown in FIG. 2, the facsimile machine 1 includes the NCU 19, the wireless tag reader 15, the wireless tag writer 16, a modem 20, a buffer 21, the scanner 22, a coding unit 23, a decoding unit 24, the laser printer 30, the detection sensors 54, the operation panel 17, an LCD 18, an amplifier 27, and an timer 26 as peripheral devices. The peripheral devices are also coupled together through the bus line 25.

The wireless tag reader 15 reads wireless tag data stored in the wireless tag of a document as described above. The wireless tag writer 16 write wireless tag data to a wireless tag.

The modem 20 modulates and demodulates facsimile data for transmission and also transmitting and receiving various protocol signals for transmission control. The buffer 21 is a storage unit for temporally storing data including coded facsimile data transmitted to and received from an associated facsimile machine.

The scanner 22, which forms a part of the automatic document feeder 2 as described above, reads a document sent in page units from the document placement unit 2A and generates image data in page units.

The coding unit 23 codes the facsimile data in transmitting the facsimile data. The decoding unit 24 is a unit for reading and decoding the reception data stored in the buffer 21.

The laser printer 30 prints the image data decoded in the decoding unit 24 on a record sheet stored in any of the first sheet feed tray 51, the second feed tray 52, and the third sheet feed tray 53 as described above. The detection sensor 54 is a sensor disposed in each of the first sheet feed tray 51 to the third sheet feed tray 53 for detecting the presence or absence of a wireless tag on each record sheet stored in the corresponding sheet feed tray.

The operation panel 17 includes keys of numeric keys, the start key mentioned above, etc. When any of the keys of the operation panel 17 are operated, an input signal is transmitted to the CPU 11 and control is performed based on the input signal. For example, in the facsimile machine 1, a destination facsimile machine of facsimile transmission may be specified by operating the numeric keys.

The LCD 18 is a display implemented as a liquid crystal display. Various types of displays concerning the facsimile machine 1 are produced on the LCD 18 under the control of the CPU 11. For example, if the destination is specified using the operation panel 17, the destination number based on numeric key input is displayed on the LCD 18.

The timer 26 counts the current date and time. When a fax transmission processing program (see FIG. 6) or a fax reception processing program (see FIG. 12) is executed, the timer 26 is referenced and is used for control concerning a watermark and a stamp.

Figure 3A:
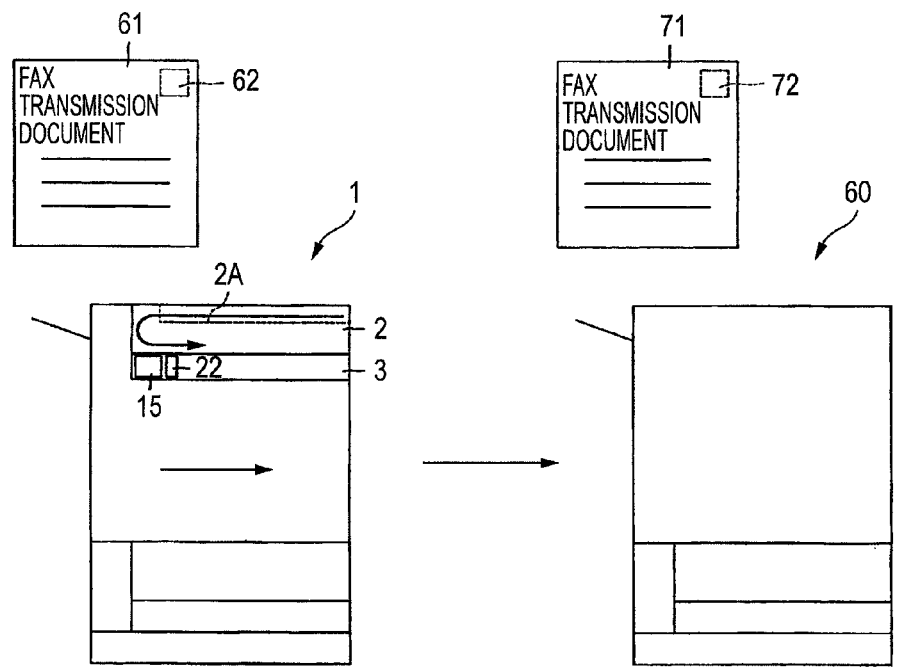
FIG. 3A is a block diagram showing facsimile transmission and reception of the facsimile machine according to an exemplary embodiment of the present invention.

Next, an outline of transmission and reception of facsimile data 63 in the facsimile machine 1 according to the exemplary embodiment will be discussed in detail with reference to FIGS. 3A and 3B. FIG. 3A is a schematic representation relevant to facsimile transmission and reception executed between the facsimile machine 1 and the destination apparatus 60.

The destination apparatus 60 shown in FIG. 3A according to the exemplary embodiment has similar configuration to the facsimile machine 1 described above.

As shown in FIG. 3A, an image (including a pattern and text) is formed in a document to be transmitted by facsimile. The document will be hereinafter referred to as transmission document 61 and a wireless tag 62 in which wireless tag data can be stored is embedded therein.

When the transmission document 61 is placed on the document placement unit 2A and a start key (not shown) of the operation panel 17 is pressed, the transmission document placed on the document placement unit 2A is sent one page at a time to a data read position of the scanner unit 3.

The data read position of the wireless tag reader 15 is provided on a conveying path of the transmission document 61 in the scanner 22. Therefore, the wireless tag reader 15 can read the wireless tag data of the wireless tag 62 added to the transmission document 61 in the process in which the transmission document 61 is conveyed at the read position of the scanner 22 by the automatic document feeder 2.

Consequently, the facsimile machine 1 can read the wireless tag data through the wireless tag reader 15 almost at the same time as the image data is read through the scanner 22. This means that the facsimile machine 1 can read the image data and the wireless tag data simply by performing easy work of placing the transmission document 61 on the document placement unit 2A and operating the start key.

The placement relationship between the scanner 22 and the wireless tag reader 15 is not limited thereto and various modes may be possible. For example, the wireless tag reader 15 may be provided aside from the conveying path of the transmission document 61. In this case, a use mode in which only wireless tag data is previously read collectively as required is also made possible.

Next, the configuration of the facsimile data 63 corresponding to the transmission document 61 of one page read through the scanner 22 and the wireless tag reader 15 and transmitted to the destination apparatus 60 will be discussed in detail with reference to FIG. 3B. FIG. 3B is a schematic representation to show the data configuration of one page of the transmission document 61.

As described above, the facsimile data 63 includes the image data based on the transmission document 61 in page units and the wireless tag data read from the wireless tag 62 of the transmission document 61 (in this case, one page). That is, the facsimile data 63 includes the image data read through the scanner 22 and the wireless tag data read through the wireless tag reader 15 in association with each other in page units.

If the facsimile data 63 is transmitted to the destination apparatus 60, the destination apparatus 60 can form an image on a record sheet 71 (see FIG. 3A) based on the image data included in the facsimile data 63.

The destination apparatus 60 can also write the wireless tag data included in the facsimile data 63 into a wireless tag 72 added to the record sheet 71.

Figure 3B:
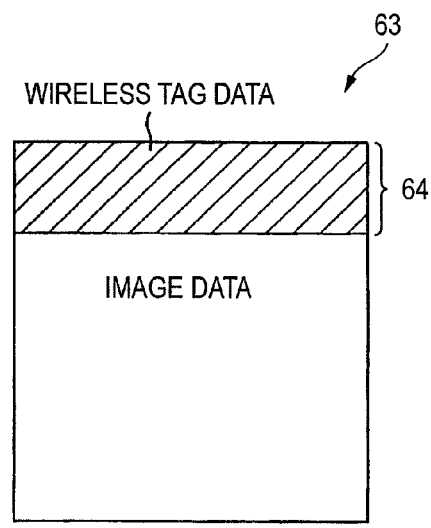
FIG. 3B is a drawing to schematically show facsimile data of one page.

As shown in FIG. 3B, the one-page facsimile data 63 is designed so that the wireless tag data is transmitted preceding the image data. Therefore, if the size of the wireless tag data can be determined, the received data can be separated into the wireless tag data and the image data.

To transmit the facsimile data 63 to the destination apparatus 60, the facsimile machine 1 according to the exemplary embodiment first transmits size information concerning a size 64 of the wireless tag data to the destination apparatus 60. Then, the destination apparatus 60 can determine based on the received size information that the data of the predetermined size from the top of the reception data corresponding to the size information is the wireless tag data, and can separate the reception data into the image data and the wireless tag data.

Next, the configurations of the wireless tags 62, 72 and the wireless tag reader 15 and the wireless tag writer 16 of the facsimile machine 1 according to the exemplary embodiment will be discussed in detail with reference to FIGS. 4A and 4B. To begin with, the configuration of the wireless tag 62 will be discussed.

Figure 4A:
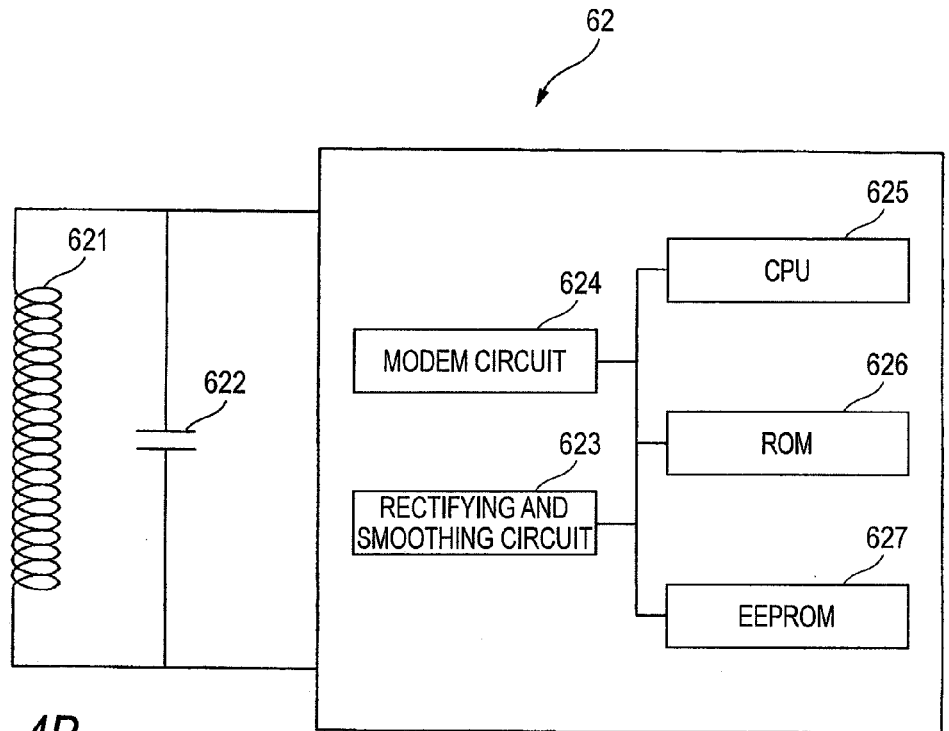
FIG. 4A is a block diagram to show the configuration of a wireless tag and FIG. 4B is a block diagram to show the configuration of a wireless tag reader and a wireless tag writer.

As shown in FIG. 4A, the wireless tag 62 includes an antenna coil 621, a resonant capacitor 622, a rectifying and smoothing circuit 623, a modem circuit 624, a CPU 625, ROM 626, and EEPROM 627.

The antenna coil 621 is coupled in parallel with the resonant capacitor 622 to form a resonance circuit for receiving power radio wave vibration of a predetermined high frequency transmitted from the wireless tag reader 15 or the wireless tag writer 16 and supplying the power radio wave signal to the rectifying and smoothing circuit 623.

The rectifying and smoothing circuit 623 forms a power supply circuit. The rectifying and smoothing circuit 623 rectifies and smoothes the power radio wave signal transmitted from the resonance circuit to generate DC power of a given voltage, and supplies it to the CPU 625, etc.

The transmission signal from the wireless tag reader 15 or the wireless tag writer 16 is superposed on the power radio wave signal for transmission. The transmission signal is demodulated by the modem circuit 624 and the signal is fed into the CPU 625.

The CPU 625 operates in accordance with an operation program stored in the ROM 626 and executes predetermined processing responsive to the signal input from the modem circuit 624. That is, the CPU 625 executes write processing of writing received data into the EEPROM 627 as wireless tag data, read processing of reading wireless tag data from the EEPROM 627, demodulating the data by the modem circuit 624, and then transmits the result as a radio wave signal from the antenna coil 621, etc.

In the wireless tag 62, the rectifying and smoothing circuit 623, the modem circuit 624, the CPU 625, the ROM 626, and the EEPROM 627 are integrated into an IC chip, which is embedded in the transmission document 61 together with the antenna coil 621 and the resonant capacitor 622. The wireless tag 72 has similar configuration to the wireless tag 62 and embedded in the record sheet 71.

Next, the configurations of the wireless tag reader 15 and the wireless tag writer 16 according to the first exemplary embodiment will be discussed in detail with reference to the accompanying drawings. FIG. 5B is a block diagram to show the configurations of the wireless tag reader 15 and the wireless tag writer 16.

Figure 4B:
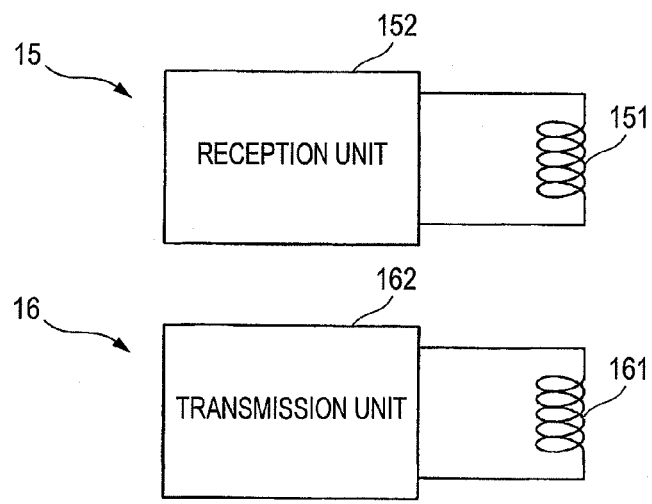

As shown in FIG. 4B, the wireless tag reader 15 comprises a reception antenna coil 151 and a reception unit 152. Therefore, the wireless tag reader 15 can receive a radio wave signal transmitted from the wireless tag 62 at the reception antenna coil 151. The wireless tag reader 15 demodulates the radio wave signal received at the reception antenna coil 151 in the reception unit 152, thereby judging the signal to be wireless tag data. Accordingly, the wireless tag reader 15 can read the wireless tag data from the wireless tag 62.

The wireless tag writer 16 comprises a transmission antenna coil 161 and a transmission unit 162. Therefore, the wireless tag writer 16 can modulate a carrier signal in the transmission unit 162 and can transmit the signal from the transmission antenna coil 161 as a power radio wave signal. Further, the wireless tag writer 16 can modulate the wireless tag data to be transmitted so as to superpose the data on the power radio wave signal in the transmission unit 162 and can transmit the data signal from the transmission antenna coil 161. Accordingly, the wireless tag writer 16 can write the wireless tag data to the wireless tag 62.

Subsequently, various pieces of data included in the wireless tag data will be discussed in detail with reference to FIG. 5. FIG. 5 is a schematic representation to show various pieces of data included in the wireless tag data in the exemplary embodiment of the present invention. As shown in FIG. 5, the EEPROM 627 of the wireless tag 62 includes three storage areas of a unique ID area, a system area, and a user area are.

The unique ID area stores identification information unique to the wireless tag 62. Therefore, by referencing the unique ID area, the wireless tag 62 can be identified. The system area stores necessary data for performing general control of the wireless tag 62 and the like.

The user area is a storage area into which the user can write wireless tag data and includes, for example in FIG. 5, watermark setting data, mark composition data, and mark attachment start date and time data.

The watermark data may include the three data pieces of the watermark setting data, the mark composition data, and the mark attachment start date and time data. Stamp data may include similar data pieces.

The watermark setting data indicates various settings concerning the watermark including "mark presence/absence setting," "mark synthesis setting," and "date limitation setting."

The "mark presence/absence setting" is setting concerning addition of the watermark to the image data corresponding to the transmission document 61. That is, according to "mark presence/absence setting", it is determined whether or not to add the watermark based on the mark composition data described later to the image data on the record sheet 71 of the destination apparatus 60.

The "mark synthesis setting" indicates setting of the transmission mode of the watermark data. Two types of settings of "synthesis setting" and "non-synthesis setting" exist in the "mark synthesis setting." If "synthesis setting" is set, the facsimile machine 1 transmits composite image data provided by combining the watermark image data based on the watermark setting data with the image data corresponding to the transmission document 61 to the destination apparatus 60.

On the other hand, if "non-synthesis setting" is set, the facsimile machine 1 transmits the image data corresponding to the transmission document 61 and the wireless tag data corresponding to the wireless tag 62 to the destination apparatus 60. In this case, upon reception of the transmitted data, the destination apparatus combines the image data and the watermark image data into composite image data and records the composite image data on the record sheet 71.

The "date limitation setting" is data indicating the setting as to whether or not the recording date of the image data to which the watermark image is added on the record sheet 71 is limited in the destination apparatus 60 when the transmission document 61 is transmitted. This means that "date limitation: Included" is set if the date and time at which watermark addition will be started is defined in the mark attachment start date and time data described later.

The mark composition data indicates the composition of the watermark image recorded on the record sheet 71 at the destination. The mark composition data includes "character string," "font," "size," "color information," and "code information" composing the watermark, and the composition of the watermark image is defined according to the data. The mark composition data also has "position information X," "position information Y," and "angle information," and the placement mode of the watermark image on the record sheet 71 is determined based on the data.

The mark attachment start date and time data defines the date and time at which recording the watermark image will be started on the record sheet 71 at the destination. That is, if the reception date and time at the destination exceeds the date and time indicated by the mark attachment start date and time data, composite image data into which the image data and the watermark image data are combined is recorded on the record sheet 71 at the destination.

The mark attachment start date and time data is not limited to the mode in which only the start date and time of attaching the watermark is defined. That is, it is also possible to define the termination date and time of attaching the watermark and it is also possible to define the start date and time and the termination date and time of attaching the watermark (namely, define the watermark attachment time period).

Various pieces of data concerning the watermark included in the wireless tag data as shown in FIG. 5 can also be specified through a user-setting screen when the transmission document 61 is created in a personal computer, for example. For example, JP-A-2001-328325 describes a user-setting screen and a setting method thereof. The set information concerning the watermark is written into the wireless tag 62 on a record sheet through the wireless tag writer 16 when the transmission document 61 is printed on the record sheet on the laser printer 30 of the facsimile machine 1. Thus, the transmission document 61 with the watermark data written into the wireless tag 62 according to the exemplary embodiment is generated.

It is noted that the watermark mentioned herein as an example of a mark is an image generated based on mark data aside from image data of a transmission document and is reproduced on the same record sheet as the image data of the transmission document. The mark may include "stamp" in addition to "watermark." The mark recording mode may be background print of recording the mark as the background of the image data of the document or may be stamp print of overlap printing of the mark roughly at the same density as the image data of the document. Further, the description indicted by the mark may be any description. It may be the description indicating copyright information or may be a symbol or a character string.

Figure 6:
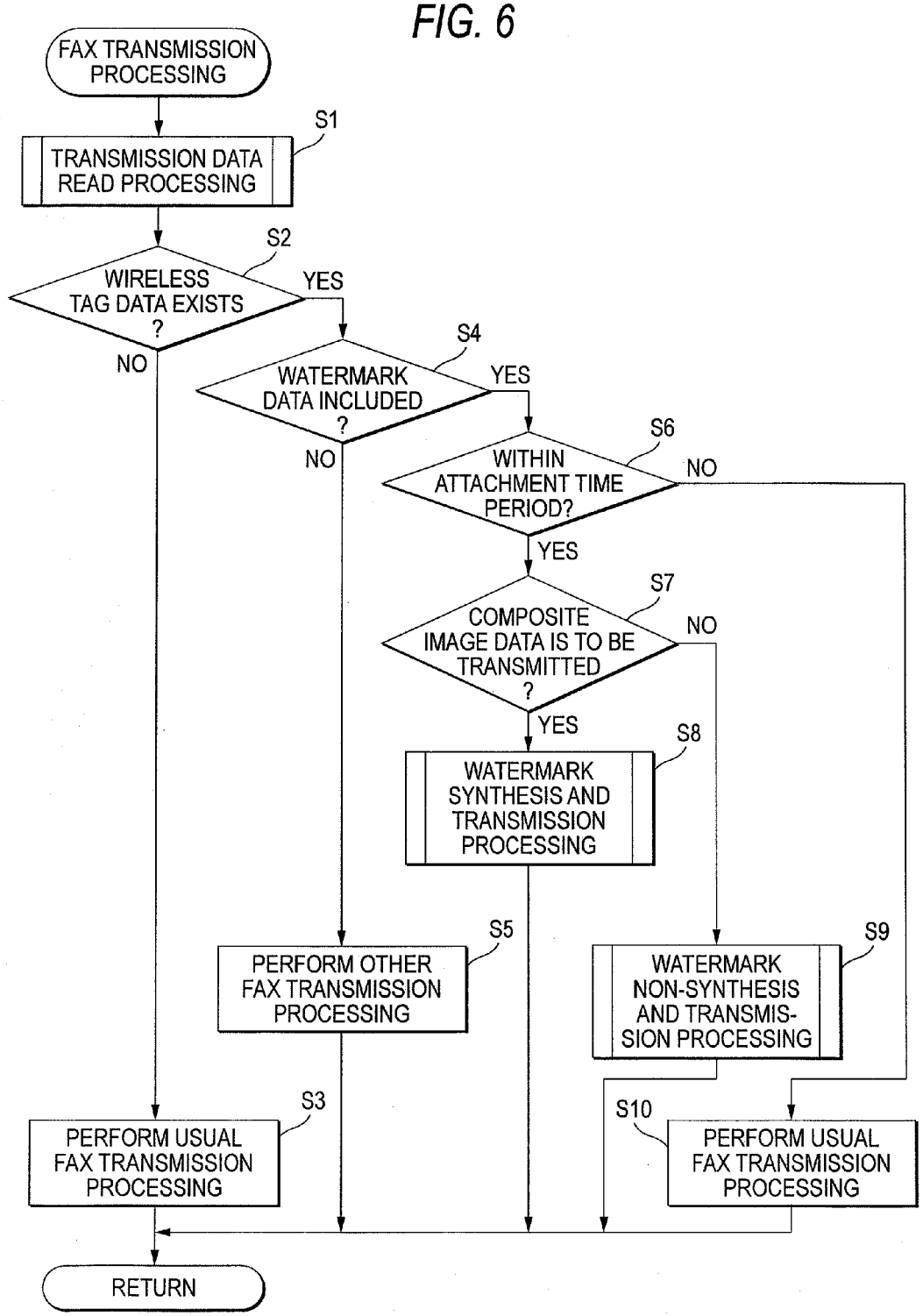
FIG. 6 is a flowchart of facsimile transmission processing.

Next, the fax transmission processing program of the facsimile machine 1 according to the exemplary embodiment will be discussed in detail with reference to FIG. 6. FIG. 6 is a flowchart of the fax transmission processing program. The fax transmission processing program is started from entry of the destination of the transmission document 61 through the operation panel 17 and operation of the start key. In the description, the case where a watermark is added to the image data of the transmission document 61 is taken as an example.

When the fax transmission processing program starts, the CPU 11 first executes transmission data read processing (S1). In this transmission data read processing (S1), the CPU 11 executes a transmission data read processing program described later with reference to FIG. 7. Specifically, the CPU 11 reads image data from the transmission document 61 and reads wireless tag data from the wireless tag 62 corresponding to the transmission document 61. The transmission data read processing program is described later in detail with reference to the FIG. 7.

At operation S2, the CPU 11 determines whether or not wireless tag data exists in the transmission document 61 based on the result of the transmission data read processing (S1). If wireless tag data exists (YES at S2), the CPU 11 proceeds to operation S4. On the other hand, if no wireless tag data exists (NO at S2), the CPU 11 proceeds to usual fax transmission processing (S3).

In the usual fax transmission processing (S3), the CPU 11 transmits only the image data acquired in the scanner unit 3 to the destination apparatus 60. The usual fax transmission processing (S3) is already known and therefore will not be discussed in detail.

When the usual fax transmission processing (S3) terminates, the CPU 11 terminates the fax transmission processing program.

If it is determined that wireless tag data exists in the transmission document 61 according to the result of the transmission data read processing, the CPU 11 determines whether or not watermark data is included in the wireless tag data (S4). If watermark data is included (YES at S4), the CPU 11 proceeds to operation S6. On the other hand, if no watermark data is included (NO at S4), the CPU 11 executes other fax transmission processing (S5).

At operation S5, fax transmission processing based on any other data included in the wireless tag data is performed. When the processing at operation S5 terminates, the CPU 11 terminates the fax transmission processing program.

At operation S6, the CPU 11 references the mark attachment start date and time data of the watermark data acquired in the transmission data read processing (S1) and determines whether or not the watermark is to be recorded on the record sheet 71 at the destination. That is, the CPU 11 determines whether or not to transmit the watermark data together with the image data of the transmission document 61.

The CPU 11 acquires the current date and time information from the timer 26 and if the current date and time exceeds the mark attachment start date and time indicated by the mark attachment start date and time data (YES at S6), the CPU 11 proceeds to S7. On the other hand, if the current date and time does not yet exceed the mark attachment start date and time (NO at S6), the CPU 11 proceeds to usual fax transmission processing (S10). This usual fax transmission processing (S10) is the same as the processing at operation S4 described above and is processing of transmitting only the image data of the transmission document 61 to the destination apparatus 60.

When the usual fax transmission processing (S10) terminates, the CPU 11 terminates the fax transmission processing program.

At operation S7, the CPU 11 determines whether or not to transmit composite image data provided by combining the watermark image data based on the watermark data with the image data corresponding to the transmission document 61 to the destination. Specifically, the CPU 11 references "mark synthesis setting" of the watermark data acquired in the transmission data read processing (S1) and makes a determination at operation S7.

If "mark synthesis setting" is "synthesis setting" indicating transmission of composite image data (YES at S7), the CPU 11 proceeds to watermark synthesis and transmission processing (S8). In the watermark synthesis and transmission processing (S8), the CPU 11 generates composite image data from the image data of the transmission document 61 and the watermark image data based on the watermark data and transmits the composite image data to the specified destination apparatus 60. Then, after transmitting the composite image data as facsimile data 63, the CPU 11 terminates the fax transmission processing program.

Figure 8:
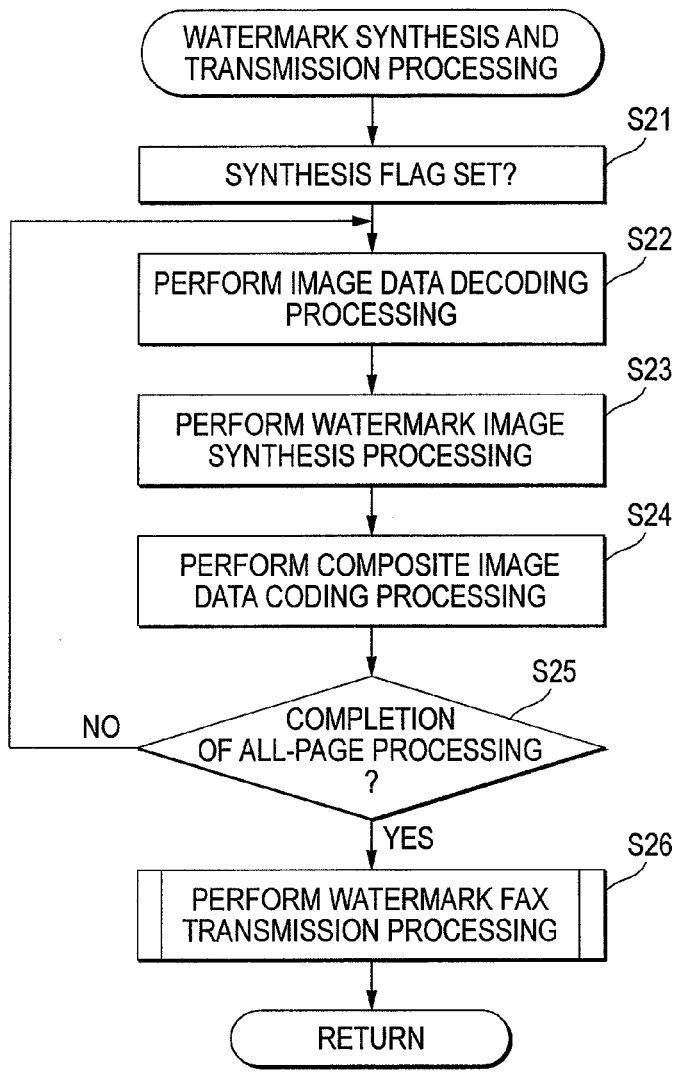
FIG. 8 is a flowchart of a watermark synthesis and transmission processing program.

The watermark synthesis and transmission processing (S8) is described later in detail with reference to FIG. 8.

On the other hand, if "mark synthesis setting" is not "synthesis setting" (NO at S7), namely, "non-synthesis setting" is set, the CPU 11 executes watermark non-synthesis and transmission processing (S9). In the watermark non-synthesis and transmission processing (S9), the CPU 11 does not generate composite image data and transmits the image data and the wireless tag data to the destination apparatus 60 as facsimile data 63. After transmitting the facsimile data 63, the CPU 11 terminates the fax transmission processing program.

Figure 9:
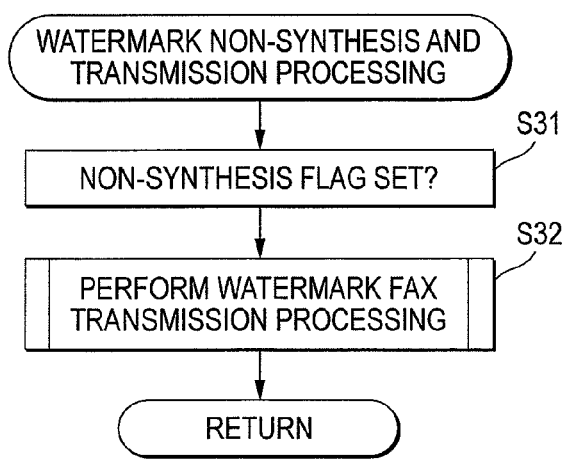
FIG. 9 is a flowchart of a watermark non-synthesis and transmission processing program.

The watermark non-synthesis and transmission processing (S9) is also described later in detail with reference to FIG. 9.

Figure 7:
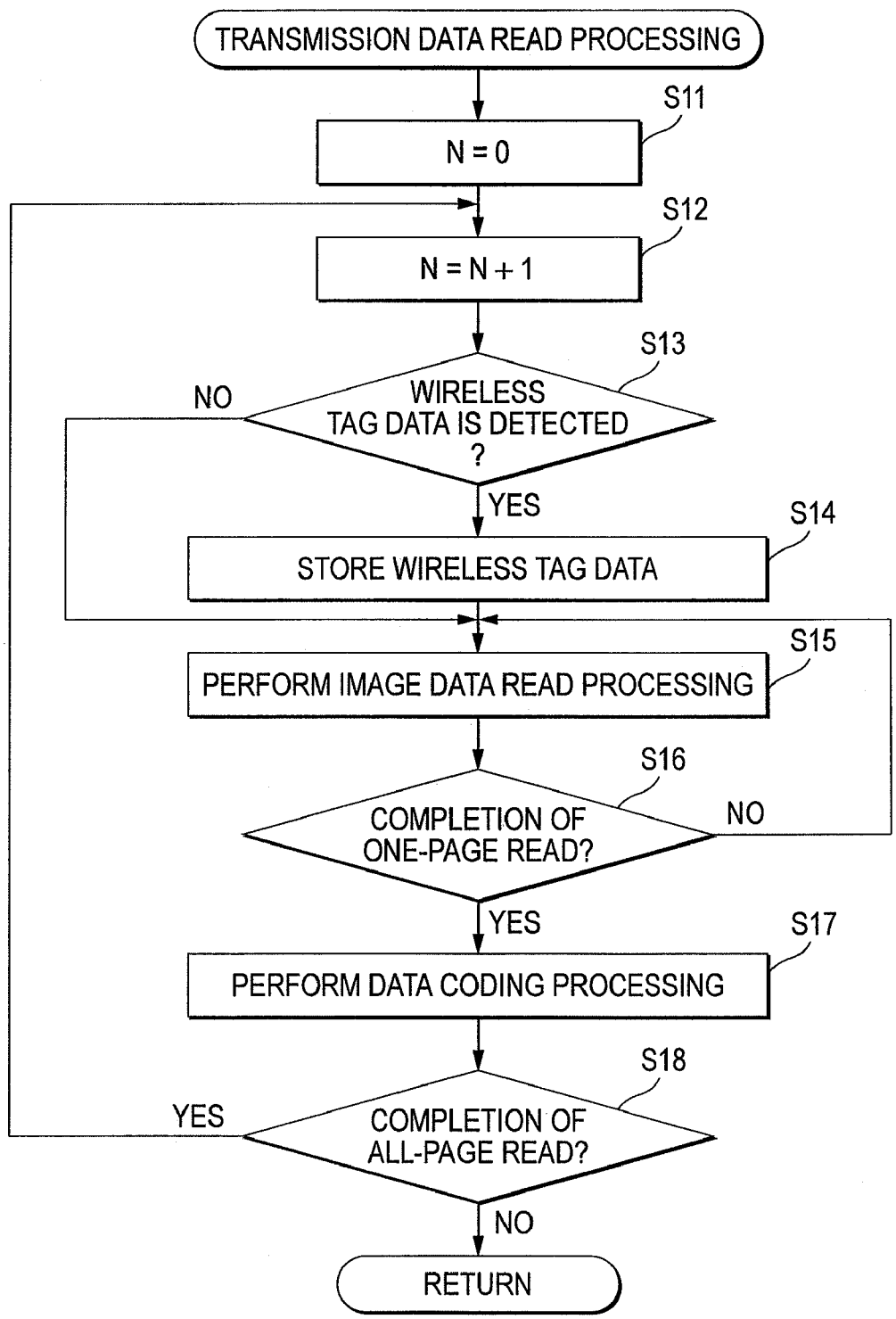
FIG. 7 is a flowchart of a transmission data read processing program.

Next, the transmission data read processing program executed at operation S1 of the fax transmission processing program will be discussed in detail with reference to FIG. 7. FIG. 7 is a flowchart of the transmission data read processing program.

At the transmission data read processing (S1), the CPU 11 first initializes the value of counter N in the RAM 13 to 0 (S11) and adds 1 to the current value of the counter N (S12). Next, the CPU 11 conveys one page of the transmission document 61 placed on the document placement unit 2A to the read position of the scanner unit 3 by the automatic document feeder 2.

Then, at operation S13, the CPU 11 determines whether or not the wireless tag data stored in the wireless tag 62 added to the transmission document 61 is detected. Specifically, the CPU 11 determines the presence or absence of the wireless tag data with the wireless tag reader 15 disposed in the proximity of the conveying path to the read position of the scanner unit 3. If the wireless tag data is detected (YES at S13), the CPU 11 proceeds to S14. On the other hand, if the wireless tag data is not detected (NO at S13), the CPU 11 proceeds to S15.

It is noted that the expression "if the wireless tag data is not detected" includes the "case where no wireless tag 62 is added to the transmission document 61."

At operation S14, the CPU 11 reads the detected wireless tag data with the wireless tag reader 15 and stores the wireless tag data in the RAM 13. At this time, the CPU 11 detects the data size of the wireless tag data and stores the data size in the transmission wireless tag data size storage area 132. Then, the CPU 11 proceeds to S15.

At operation S15, the CPU 11 executes image data read processing. In the image data read processing (S15), the CPU 11 reads the image data of the transmission document 61 through the scanner unit 3. The CPU 11 continues to acquire the image data through the scanner unit 3 until the image data of one page of the transmission document 61 is acquired (NO at S16). When the image data of one page of the transmission document 61 is acquired (YES at S16), the CPU 11 proceeds to operation S17.

At operation S17, the CPU 11 executes data coding processing. Specifically, the CPU 11 codes the wireless tag data and the image data acquired from one page of the transmission document 61 into a scheme appropriate for the facsimile transmission by the coding unit 23. The CPU 11 stores the coded data in the transmission facsimile data storage area 131 as the facsimile data 63. After the termination of the data coding processing, the CPU proceeds to operation S18.

At operation S18, the CPU 11 determines whether or not all pages of the transmission document 61 placed on the document placement unit 2A have been read. If not all pages have been read (NO at S18), the process returns to operation S12. Accordingly, acquisition processing of the image data and the wireless tag data corresponding to the next page of the transmission document 61 is performed. On the other hand, if all pages have been read (YES at S18), the CPU 11 terminates the transmission data read processing program and proceeds to operation S2 of the fax transmission processing program.

At this point in time, the data size of the wireless tag of the transmission document 61 is stored in the transmission wireless tag data size storage area 132, and the facsimile data 63 including the image data and the wireless tag data of the transmission document 61 is stored in the transmission facsimile data storage area 131.

Next, the watermark synthesis and transmission processing program executed at operation S8 of the fax transmission processing will be discussed in detail with reference to FIG. 8. FIG. 8 is a flowchart of the watermark synthesis and transmission processing program.

In the watermark synthesis and transmission processing (S8), the CPU 11 first sets a synthesis flag and stores the flag in the RAM 13 (S21). This synthesis flag is a flag indicating transmission of composite image data in which the watermark image data and the image data acquired in the scanner unit 3 are combined. After setting the synthesis flag, the CPU 11 proceeds to operation S22.

At operation S22, the CPU 11 executes image data decoding processing. In the image data decoding processing (S22), the CPU 11 reads the image data part of one page of the facsimile data 63 from the transmission facsimile data storage area 131 and decodes the coded image data by the decoding unit 24. After decoding the image data, the CPU 11 proceeds to operation S23.

At operation S23, the CPU 11 executes watermark image synthesis processing. This watermark image synthesis processing (S23) combines the watermark image data with the decoded one-page image data to generate composite image data. Specifically, the CPU 11 generates watermark image data based on the mark composition data included in the wireless tag data and combining the watermark image data and the decoded image data into composite image data. After generating the composite image data, the CPU 11 proceeds to operation S24.

At operation S24, the CPU 11 executes composite image data coding processing (S24). Specifically, the CPU 11 codes the composite image data generated in the watermark image synthesis processing (S23) into the scheme appropriate for the facsimile transmission by the coding unit 23. The CPU 11 again stores the coded data in the transmission facsimile data storage area 131 as the facsimile data 63. After the termination of the composite image data coding processing (S24), the CPU proceeds to operation S25.

At operation S25, the CPU 11 determines whether or not processing for all pages of the facsimile data 63 is complete. If processing for all pages is not complete (NO at S25), the process returns to S22. Accordingly, processing of the next-page data is performed in the facsimile machine 1. On the other hand, if processing for all pages is complete (YES at S25), the CPU 11 proceeds to operation S26.

At operation S26, the CPU 11 executes watermark fax transmission processing. In the watermark fax transmission processing (S26), if the destination apparatus 60 satisfies a predetermined condition, the CPU 11 transmits the facsimile data 63 based on the composite image data. After transmitting the facsimile data 63, the CPU 11 terminates the watermark synthesis and transmission processing program and returns the process to the fax transmission processing program.

Figure 10:
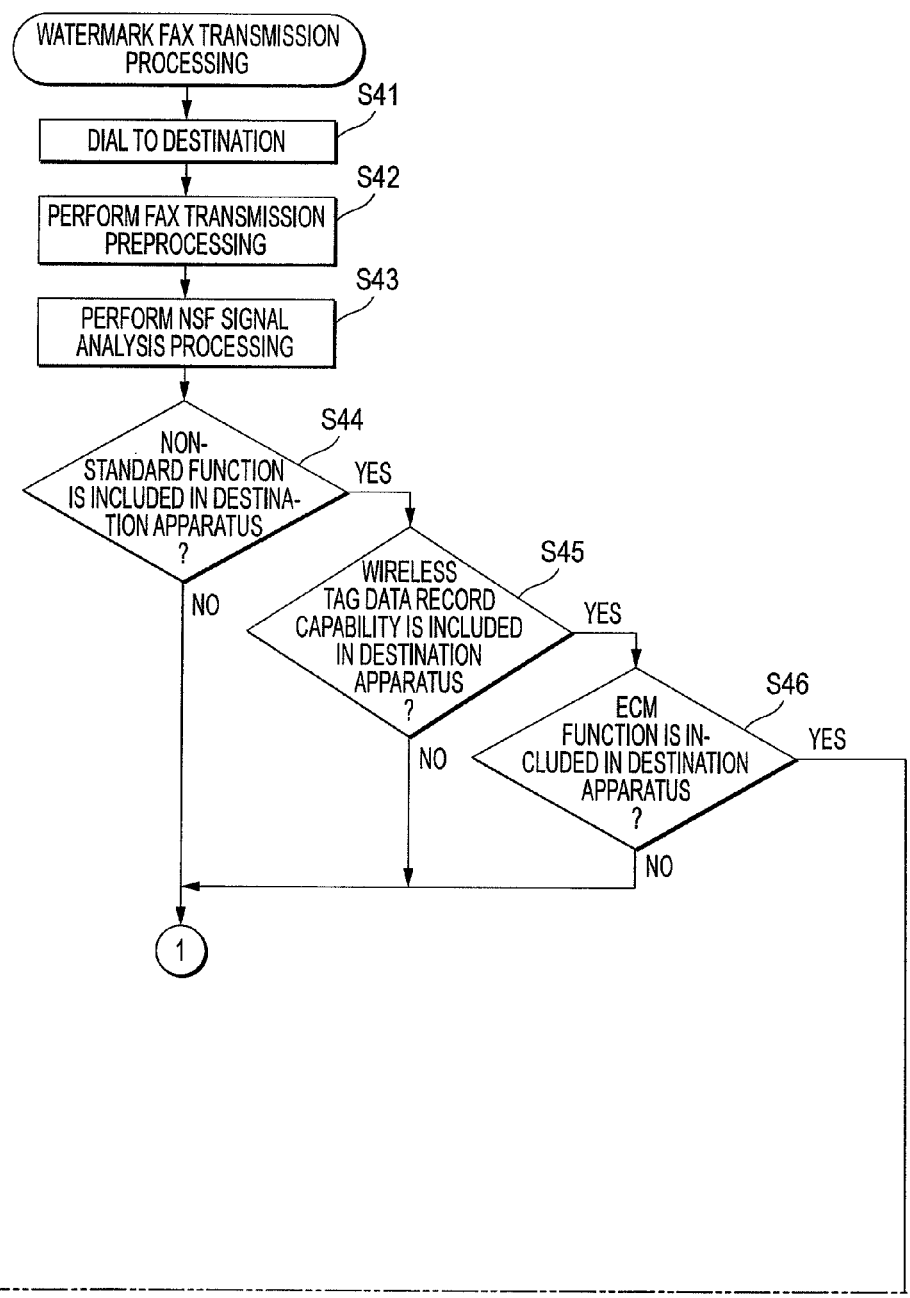
FIG. 10 is a first flowchart of a watermark fax transmission processing program.
Figure 11:
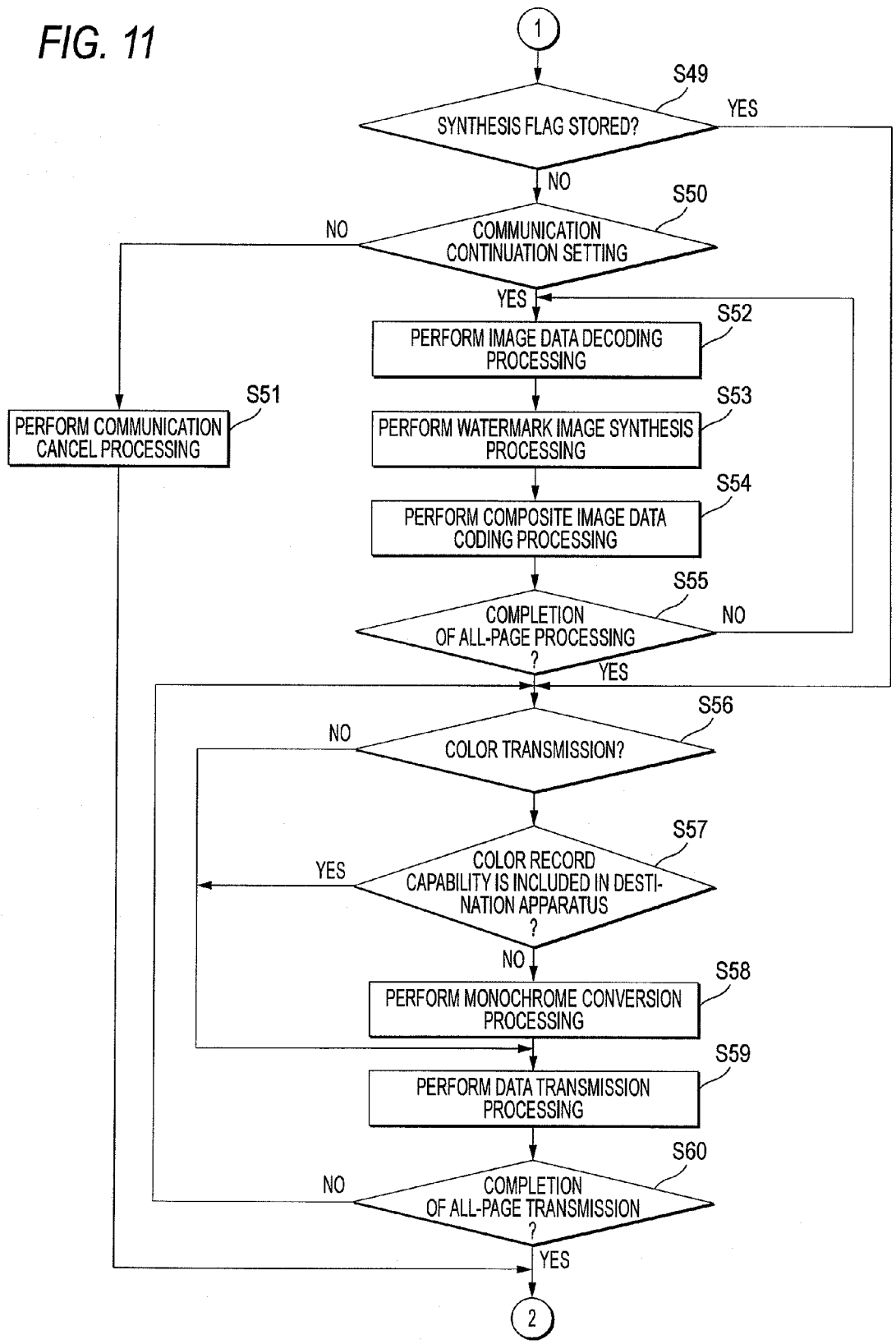
FIG. 11 is a second flowchart of the watermark fax transmission processing program.

The watermark fax transmission processing (S26) is described later in detail with reference to FIGS. 10 and 11.

Next, the watermark non-synthesis and transmission processing executed at operation S9 of the fax transmission processing will be discussed in detail with reference to FIG. 9. FIG. 9 is a flowchart of the watermark non-synthesis and transmission processing program.

In the watermark non-synthesis and transmission processing (S9), the CPU 11 first sets a non-synthesis flag and stores the non-flag in the RAM 13 (S31). This non-synthesis flag is a flag indicating transmission of the image data and the wireless tag data (including watermark data) corresponding to the transmission document 61 as they are without generating composite image data as in the watermark synthesis and transmission processing (S8). After setting the non-synthesis flag, the CPU 11 proceeds to operation S32.

At operation S32, the CPU 11 executes watermark fax transmission processing. In the watermark fax transmission processing (S32), the CPU 11 executes the watermark fax transmission processing program as at S26. The watermark fax transmission processing (S32) is described later in detail with reference to FIGS. 10 and 11.

After the termination of the watermark fax transmission processing (S32), the CPU 11 terminates the watermark non-synthesis and transmission processing program and returns the process to the fax transmission processing program.

Subsequently, the watermark fax transmission processing program will be discussed in detail with reference to FIGS. 10 and 11. The watermark fax transmission processing program is executed by the CPU 11 at S26 of the watermark synthesis and transmission processing program or S32 of the watermark non-synthesis and transmission processing program. FIGS. 10 and 11 are flowcharts of the watermark fax transmission processing program.

When the watermark fax transmission processing program starts, the CPU 11 first dials the destination previously entered through the operation panel 17 (S41) and executes fax transmission preprocessing (S42). In this fax transmission preprocessing (S42), the CPU 11 transmits and receives various signals (for example, transmits a CI signal and a CNG signal, receives an NSF signal, etc.,) to and from the destination apparatus 60. When the fax transmission preprocessing (S42) terminates, the CPU 11 proceeds to operation S43.

At operation S43, the CPU 11 executes NSF signal analysis processing. The NSF signal is a facsimile control signal sent from the recipient apparatus to the transmitting apparatus and is a signal for reporting non-standard functions of the destination apparatus 60 (namely, manufacturer-specific functions other than the functions defined in the ITU standard) from the destination apparatus 60 to the facsimile machine 1.

In the NSF signal analysis processing (S43), the CPU 11 analyzes the NSF signal received from the destination apparatus 60 in the fax transmission preprocessing (S42) and determines the functions of the destination apparatus 60. Specifically, the CPU 11 determines at least the presence or absence of a non-standard function, the presence or absence of a wireless tag data record capability (tag data receiving function), the presence or absence of an Error Correction Mode (ECM) function (re-transmission function), and the presence or absence of a color record capability (color output function) in the destination apparatus 60 by analyzing the NSF signal. After the NSF signal analysis processing (S43) terminates, the CPU 11 proceeds to operation S44.

At operation S44, the CPU 11 determines whether or not the destination apparatus 60 includes a non-standard function based on the analysis result of the NSF signal analysis processing (S43). If the destination apparatus 60 includes a non-standard function (YES at S44), the CPU 11 proceeds to S45. On the other hand, if the destination apparatus 60 does not involve any non-standard function and has only functions defined in the ITU standard (NO at S44), the CPU 11 proceeds to S49.

At operation S45, the CPU 11 determines whether or not the destination apparatus 60 includes a wireless tag data record capability based on the analysis result of the NSF signal analysis processing (S43). The wireless tag data record capability refers to the capability of receiving wireless tag data and writing the wireless tag data into a wireless tag. If the destination apparatus 60 includes the wireless tag data record capability (YES at S45), the CPU 11 proceeds to operation S46. On the other hand, if the destination apparatus 60 does not include the wireless tag data record capability (NO at S45), the CPU 11 proceeds to operation S49.

At operation S46, the CPU 11 determines whether or not the destination apparatus 60 includes an ECM function based on the analysis result of the NSF signal analysis processing (S43). The ECM function refers to a function of requesting the transmitting apparatus (in this case, the facsimile machine 1) to re-transmit the transmission document data if a fault occurs in data transmission time. If the destination apparatus 60 includes the ECM function (YES at S46), the CPU 11 proceeds to operation S47. On the other hand, if the destination apparatus 60 does not include the ECM function (NO at S46), the CPU 11 proceeds to operation S49.

The operation S49 and the later operations executed as a result of the determination processing at operation S44, S45, S46 is described later in detail with reference to FIG. 11.

At operation S47, the CPU 11 transmits an NSS signal to the destination apparatus 60. The NSS signal includes size information indicating the size 64 of the wireless tag data included in each facsimile data 63. Therefore, the NSS signal is sent to the destination apparatus 60, whereby the facsimile machine can inform the destination apparatus 60 of the fact that the wireless tag data corresponding to the facsimile data 63 is included and further the size information of the wireless tag data. Accordingly, the destination apparatus 60 can separate the data into the wireless tag data and the image data.

Then, the CPU 11 executes wireless tag data transmission processing (S48). That is, the CPU 11 transmits the data corresponding to the wireless tag data in the one-page facsimile data 63 stored in the transmission facsimile data storage area 131 to the destination apparatus 60.

After the termination of the wireless tag data transmission processing (S48), the CPU 11 proceeds to operation S61.

At operation S61, the CPU 11 determines whether or not transmission of the facsimile data 63 is color transmission. If "color information" in the watermark data is set to "full color," the CPU 11 determines that transmission of the facsimile data 63 is color transmission. If transmission is color transmission (YES at S61), the CPU 11 proceeds to operation S62. On the other hand, if transmission is not color transmission (NO at S61), the CPU 11 proceeds to S64 because the facsimile data 63 is set to monochrome.

At operation S62, the CPU 11 determines whether or not the destination apparatus 60 includes a color record capability based on the analysis result of the NSF signal analysis processing (S43). If the destination apparatus 60 includes the color record capability (YES at S62), the CPU 11 proceeds to S64. In this case, color specification based on the color information (for example, full color, etc.,) is set in the facsimile data 63. On the other hand, if the destination apparatus 60 does not include the color record capability (NO at S62), the CPU 11 proceeds to operation S63.

At operation S63, the CPU 11 executes monochrome conversion processing. In this monochrome conversion processing (S63), the color information specifying the color is converted into color information specifying only color saturation, whereby a color image is converted into a monochrome image. The monochrome conversion processing is already known in detail and therefore will not be discussed in detail. After the monochrome conversion processing (S63), the CPU 11 proceeds to operation S64.

At operation S64, the CPU 11 transmits the one-page facsimile data 63 stored in the transmission facsimile data storage area 131 to the destination apparatus 60. At the termination of the data transmission processing (S64), the CPU 11 determines whether or not all pages of the transmission document 61 have been transmitted to the destination apparatus 60 (S65).

If all pages of the transmission document 61 have been transmitted to the destination apparatus 60 (YES at S65), the CPU 11 proceeds to transmission termination processing (S66). On the other hand, if all pages of the transmission document 61 have not yet been transmitted to the destination apparatus 60 (NO at S65), the CPU 11 returns to S48 and performs transmission processing of the next page of the transmission document 61. That is, in this case, the wireless tag data corresponding to the next page is transmitted to the destination according to the wireless tag data transmission processing (S48) and then the corresponding image data is transmitted to the destination as a color image or a monochrome image.

The case where the CPU 11 proceeds to operation S49 will be discussed in detail with reference to FIG. 11.

At operation S49, the CPU 11 determines whether or not the synthesis flag is stored in the RAM 13. If the synthesis flag is stored in the RAM 13 (YES at S49), the CPU 11 proceeds to operation S56. On the other hand, if the non-synthesis flag is stored in the RAM 13 (NO at S49), the CPU 11 proceeds to operation S50.

The case where the CPU 11 proceeds to operation S49 is the case where the destination apparatus 60 has only general functions (NO at S44), the case where the destination apparatus 60 does not include the wireless tag data record capability (NO at S45), or the case where the destination apparatus 60 does not include the ECM function (NO at S46). That is, there is a probability that a fault may occur in the data communications if the facsimile data 63 including the image data and the wireless tag data is transmitted to the destination apparatus 60 depending on the functions thereof.

In the facsimile machine 1 according to the exemplary embodiment, a permission or suppression of transmission in the case where it is difficult to execute intended data transmission based on the functions of the destination apparatus 60 as mentioned above can be set. That is, permission or suppression of communications can be preset, for example, by selecting "communication continuation setting" or "communication cancel setting". These settings can be made in menu setting about the facsimile functions and the setting is stored in the flash memory 14 of the facsimile machine 1.

The "communication continuation setting" is setting of converting the facsimile data 63 for transmission so that the intended image can be recorded on a record sheet 71 in the destination apparatus 60 regardless of the case as mentioned above. On the other hand, the "communication cancel setting" is setting of cancelling data transmission of the transmission document 61 if it is difficult to execute intended data transmission.

If the non-synthesis flag is stored (NO at S49), the CPU 11 proceeds to operation S50 and references the flash memory 14 and determines whether or not "communication continuation setting" is set. If "communication continuation setting" is set (YES at S50), the CPU 11 proceeds to operation S52. On the other hand, if "communication cancel setting" is set (NO at S50), the CPU 11 executes communication cancel processing (S51). In this communication cancel processing (S51), the CPU 11 performs various types of processing such as erasing of the storage contents in the transmission facsimile data storage area 131. At the termination of the communication cancel processing (S51), the CPU 11 proceeds to the transmission termination processing (S66) (see FIG. 10).

On the other hand, when the CPU 11 proceeds to operation S52, it executes image data decoding processing. This image data decoding processing (S52) is similar to the processing at operation S22 of the watermark synthesis and transmission processing program. Likewise, watermark image synthesis processing (S53) and composite image data coding processing (S54) are similar to the processing at operation S23 and operation S24 of the watermark synthesis and transmission processing program respectively. Therefore, operation S52, operation S53, and operation S54 will not be discussed in detail.

After operation S52 to operation S54 are executed, the one-page facsimile data 63 is converted from the data including the wireless tag data and the image data into data including composite image data. As the facsimile data is converted into the composite image data, an image to which a watermark image is added can be recorded on the record sheet 71 of the destination apparatus 60 regardless of the destination apparatus 60 having only general functions, the destination apparatus 60 including no wireless tag data record capability, or the destination apparatus 60 including no ECM function.

After the termination of the composite image data coding processing (S54), the CPU 11 proceeds to operation S55 and determines whether or not processing for all pages of the facsimile data 63 is complete. If processing for all pages is not complete (NO at S55), the process returns to operation S52. Accordingly, processing of the next-page data is performed in the facsimile machine 1. On the other hand, if processing for all pages is complete (YES at S55), the CPU 11 proceeds to operation S56.

At operation S26, the CPU 11 determines whether or not transmission of the facsimile data 63 is color transmission. The processing at operation S56 is similar to processing at operation S63 described above. If transmission is color transmission (YES at S56), the CPU 11 proceeds to operation S57. On the other hand, if transmission is not color transmission (NO at S56), the CPU 11 proceeds to operation S59.

At operation S57, the CPU 11 determines whether or not the destination apparatus 60 includes a color record capability. The processing at S57 is similar to processing at S62. If the destination apparatus 60 includes the color record capability (YES at S57), the CPU 11 proceeds to operation S59. On the other hand, if the destination apparatus 60 does not include the color record capability (NO at S57), the CPU 11 proceeds to operation S58.

At operation S58, the CPU 11 executes monochrome conversion processing. This monochrome conversion processing (S58) is similar to the monochrome conversion processing (S63) described above. Therefore, the monochrome conversion processing (S58) will not be discussed again in detail. After the monochrome conversion processing (S58), the CPU 11 proceeds to operation S59.

At operation S59, the CPU 11 executes data transmission processing (S59). The data transmission processing is similar to the data transmission processing (S64) described above; in this case, however, the one-page facsimile data 63 including the composite image data is transmitted.

At the termination of the data transmission processing (S59), the CPU 11 determines whether or not all pages of the transmission document 61 have been transmitted to the destination apparatus 60 (S60). If all pages of the transmission document 61 have been transmitted to the destination apparatus 60 (YES at S60), the CPU 11 proceeds to the transmission termination processing (S66) (see FIG. 10). On the other hand, if all pages of the transmission document 61 have not yet been transmitted to the destination apparatus 60 (NO at S60), the CPU 11 returns to operation S56 and performs transmission processing of the next page of the transmission document 61 (S56 to S59). Also in this case, the facsimile data 63 including the composite image data is transmitted to the destination.

Upon completion of transmission of the facsimile data 63 of all pages of the transmission document 61 (YES at S60, YES at S65), the CPU 11 executes predetermined transmission termination processing required for termination of the facsimile transmission (S66) and terminates the watermark fax transmission processing program.

Figure 12:
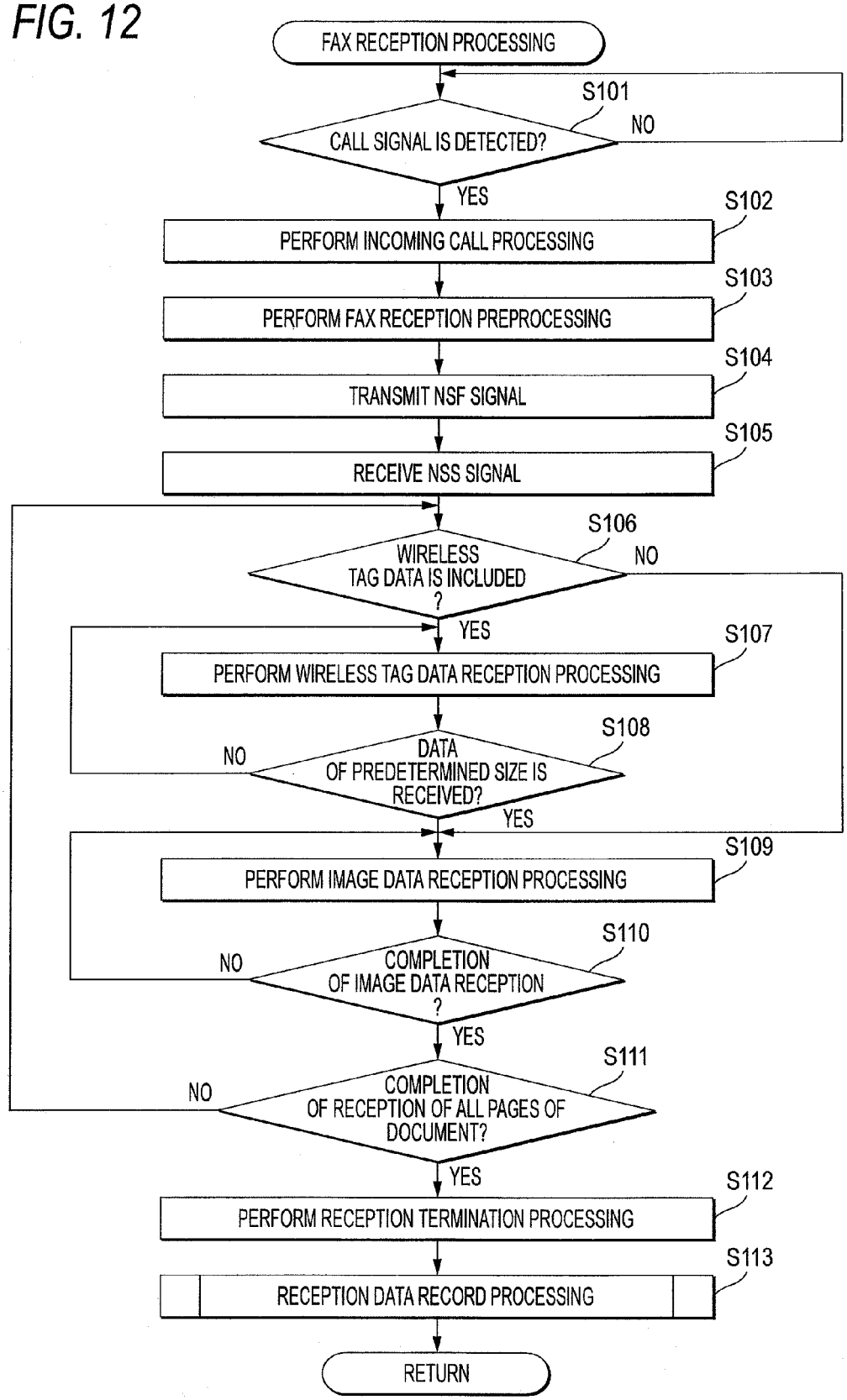
FIG. 12 is a flowchart of facsimile reception processing.

Next, the fax reception processing program of the facsimile machine 1 according to the exemplary embodiment will be discussed in detail with reference to FIG. 12. FIG. 12 is a flowchart of the fax reception processing program.

First, at operation S101, the CPU 11 determines whether or not a call signal (CI signal) is detected, and stands by until a call signal is detected (NO at S101). When a call signal is detected (YES at S101), the CPU 11 executes incoming call processing (S102).

After the incoming call processing (S102) terminates, the CPU 11 executes fax reception preprocessing (S103). In the fax reception preprocessing (S103), the CPU 11 transmits and receives various signals to and from the transmitting facsimile machine and performs signal control processing. For example, if a CNG signal is not received, the CPU 11 performs usual telephone conversation processing by telephone. After the fax reception preprocessing (S103), the CPU 11 proceeds to operation S104.

At operation S104, the CPU 11 transmits an NSF signal to the transmitting facsimile machine. As described above, the NSF signal is a signal indicating the functions of the facsimile machine 1 (for example, the presence or absence of wireless tag data record capability, the presence or absence of ECM function, etc.,). After transmitting the NSF signal, the CPU 11 proceeds to operation S105.

Then, the CPU 11 stands by until reception of an NSS signal from the transmitting facsimile machine. Upon reception of an NSS signal from the transmitting facsimile machine, the CPU 11 acquires size information of wireless tag data included in the NSS signal and stores the size information in the size information storage area 135 (see FIG. 2) (S105).

At operation S106, the CPU 11 determines whether or not wireless tag data is included in reception data based on the size information included in the NSS signal. If wireless tag data is included in reception data (YES at S106), the CPU 11 proceeds to operation S107. On the other hand, if wireless tag data is not included in reception data (NO at S106), the CPU 11 proceeds to operation S109.

If wireless tag data is included in reception data (YES at S106), the CPU 11 starts to receive the wireless tag data transmitted from the transmitting facsimile machine preceding image data as the reception data (S107). The CPU 11 receives the reception data as the wireless tag data until reception of the reception data as much as the size indicated by the size information (NO at S108). Upon reception of the data as much as the size (namely, at the termination of reception of the wireless tag data), the CPU 11 proceeds to operation S109.

At operation S109, the CPU 11 executes image data reception processing. In the image data reception processing (S109), while receiving image data transmitted following the wireless tag data as the reception data, the CPU 11 stores the data in the reception facsimile data storage area 134. The CPU 11 receives the image data until reception of one-page image data (YES at S110). Upon completion of reception of the image data, the CPU 11 proceeds to operation S111.

In the exemplary embodiment, while the reception data is being received in page units, it is separated into wireless tag data and image data based on the size information, but the present invention is not limited to this mode. That is, after reception of all reception data, the reception data can also be separated into wireless tag data and image data according to the size information.

At operation S111, the CPU 11 determines whether or not reception of all pages of reception data is complete. If all pages of reception data have been received (YES at S111), the CPU 11 executes reception termination processing (S112) and terminates reception of the reception data and proceeds to operation S113. On the other hand, if reception of all pages of reception data is not complete (NO at S111), the CPU 11 returns to operation S106 and continues reception of the next-page reception data.

At operation S113, the CPU 11 executes reception data record processing. That is, the CPU 11 executes a reception data record processing program and records reception data on a record sheet 71. The reception data record processing program is described later in detail. At the termination of the reception data record processing (S113), the CPU 11 terminates the fax reception processing program.

Figure 13:
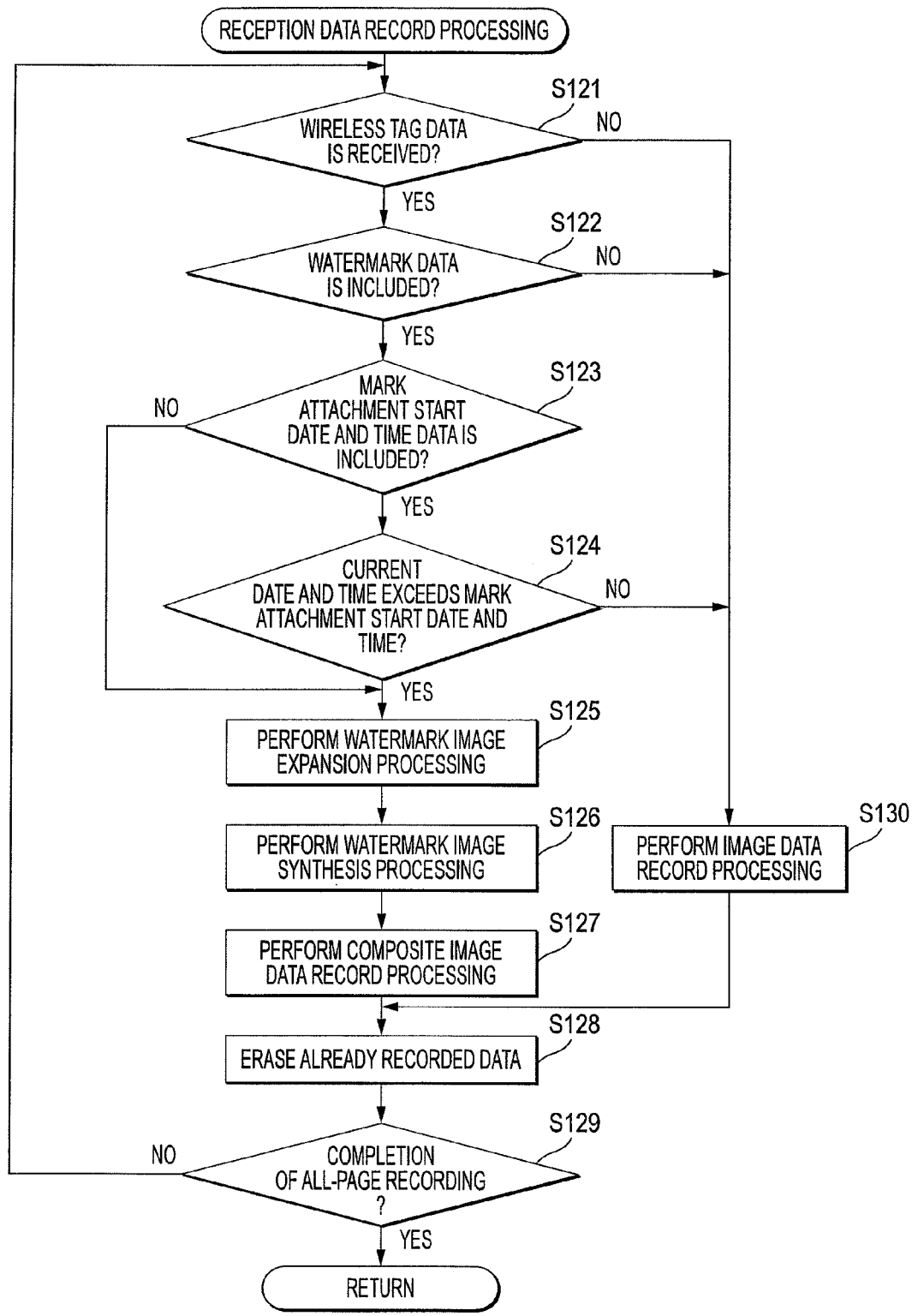
FIG. 13 is a flowchart of a reception data record processing program.

Subsequently, the reception data record processing program executed at operation S113 of the fax reception processing program will be discussed in detail with reference to FIG. 13. FIG. 13 is a flowchart of the reception data record processing program.

In the reception data record processing (S113), the CPU 11 executes the reception data record processing program. At this time, the CPU 11 first references the reception facsimile data storage area 134 and determines whether or not wireless tag data is received (S121). If wireless tag data is received (YES at S121), the CPU 11 proceeds to operation S122. On the other hand, if wireless tag data is not received (NO at S121), the CPU 11 proceeds to operation S130.

At operation S122, the CPU 11 determines whether or not watermark data is included in the wireless tag data. Specifically, the CPU 11 makes the determination at operation S122 by referencing the reception facsimile data storage area 134. If watermark data is included (YES at S122), the CPU 11 proceeds to operation S123. On the other hand, if watermark data is not included (NO at S122), the CPU 11 proceeds to image data record processing (S130).

At operation S123, the CPU 11 determines whether or not mark attachment start date and time data is included in the watermark data. If mark attachment start date and time data is included (YES at S123), the CPU 11 proceeds to operation S124. On the other hand, if mark attachment start date and time data is not included (NO at S123), the CPU 11 proceeds to operation S125.

At operation S124, the CPU 11 determines whether or not the current date and time exceeds the mark attachment start date and time. Specifically, the CPU 11 references the timer 26 and acquires the current date and time. The CPU 11 references the mark attachment start date and time data in the reception facsimile data storage area 134 and acquires the mark attachment start date and time. The CPU 11 compares the current date and time and the mark attachment start date and time to make a determination at operation S124.

If the current date and time exceeds the mark attachment start date and time (YES at S124), the CPU 11 proceeds to operation S125 to add a watermark image indicted by the watermark data to the image data corresponding to the reception data. On the other hand, if the current date and time does not exceed the mark attachment start date and time (NO at S124), the CPU 11 proceeds to the image data record processing (S130).

At operation S125, the CPU 11 executes watermark image expansion processing. In this watermark image expansion processing (S125), the CPU 11 references the reception facsimile data storage area 134 and expands the watermark image data based on the mark composition data (see FIG. 5) included in the watermark data. After expanding the watermark image data based on the mark composition data, the CPU 11 proceeds to operation S126.

At operation S126, the CPU 11 executes watermark image synthesis processing. The CPU 11 combines the watermark image data expanded at operation S125 with the image data corresponding to the reception data to generate composite image data. After generating the composite image data, the CPU 11 proceeds to operation S127.

At operation S127, the CPU 11 records the composite image data generated in the watermark image synthesis processing (S126) on a record sheet 71. That is, the CPU 11 conveys a record sheet 71 from any of the first sheet feed tray 51, the second feed tray 52 and the third feed tray 53 and records the composite image data based on the reception data on the record sheet 71 on the laser printer 30. At the termination of recording the composite image data on the record sheet 71, the CPU 11 erases the recorded reception data from the reception facsimile data storage area 134 (S128) and proceeds to operation S129.

At operation S129, the CPU 11 determines whether or not recording of all pages of reception data is complete. If all pages of reception data have been recorded (YES at S129), the CPU 11 terminates the reception data record processing program. On the other hand, if recording of all pages of reception data is not complete (NO at S129), the CPU 11 returns to operation S121 and starts to record the next-page reception data.

Herein, at operation S130, the CPU 11 executes image data record processing. In this image data record processing (S130), the CPU 11 records the image data stored in the reception facsimile data storage area 134 as the reception data on the record sheet 71 on the laser printer 30. After recording the image data on the record sheet 71, the CPU 11 proceeds to operation S128. Operations S128 and S129 are already described and therefore will not be discussed again.

In the facsimile machine 1 according to the exemplary embodiment, if the facsimile data 63 includes only the image data (NO at S121), if the facsimile data 63 includes the composite image data (NO at S122), or if the current date and time does not exceed the mark attachment start date and time (NO at S124), an image is formed on the record sheet 71 according to the image data record processing (S130).

If the facsimile data 63 includes only the image data (NO at S121) or if the current date and time does not exceed the mark attachment start date and time (NO at S124), an image based on the transmission document 61 read through the scanner unit 3 is recorded on the record sheet 71 in the transmitting facsimile machine.

If the facsimile data 63 includes the composite image data (NO at S122), an image based on the composite image data generated in the transmitting facsimile machine is recorded on the record sheet 71.

As described above, according to the facsimile machine 1 of the exemplary embodiment, if watermark data is included in the wireless tag data read through the wireless tag reader 15, the image data of the transmission document 61 read through the scanner unit 3 and the watermark image data based on the watermark data can be combined to generate composite image data and this composite image data can be transmitted as the facsimile data 63 according to the watermark synthesis and transmission processing (S8) and the watermark fax transmission processing (S26, S32).

That is, watermark data is previously written into the wireless tag 62 of the transmission document 61, whereby at the facsimile transmission time, work of creation of a watermark added to the transmission document or the like becomes unnecessary and the work burden can be lightened. Further, the work time required for the facsimile transmission can be shortened, so that a delay of facsimile transmission of other users can be prevented.

The facsimile machine 1 can transmit the image data based on the transmission document 61 read through the scanner unit 3 and the wireless tag data including the watermark data as they are by executing the watermark non-synthesis and transmission processing (S9). Accordingly, if composite image data is not generated in the transmitting facsimile machine 1, an image to which a watermark is added can be recorded on a record sheet 71 in the receiving facsimile machine 1. Further, even in this case, the transmitting user needs only to execute read work of the transmission document 61 and the wireless tag 62, the work burden on the transmitting user can be lightened, and a delay of facsimile transmission of other users can be prevented.

Further, the facsimile machine 1 can change the transmission mode of the data of the transmission document 61 in response to the presence or absence of the wireless tag data record capability of the destination apparatus 60 according to the watermark fax transmission processing (S26, S32). That is, the facsimile machine 1 can switch as required between the mode of transmitting the composite image data as the facsimile data 63 and the mode of transmitting the facsimile data 63 including the image data and the wireless tag data. Accordingly, the data of the transmission document 61 in which addition of watermark data is set can be reliably transmitted to the destination, and data transmission as intended by the user is made possible.

The facsimile machine 1 can also change the transmission mode of the data of the transmission document 61 including watermark data in response to the presence or absence of the ECM function of the destination apparatus 60 according to the watermark fax transmission processing (S26, S32). Accordingly, the data of the transmission document 61 can be reliably transmitted to the destination, so that the facsimile machine 1 can reliably manage information corresponding to the transmission document 61 in the mode desired by the user.

If the destination apparatus 60 does not include the ECM function, the facsimile machine 1 can cancel the data transmission of the transmission document 61 according to the watermark fax transmission processing (S26, S32). Accordingly, transmission of only the image data corresponding to the transmission document 61 to the destination is prevented and the facsimile machine 1 can accomplish strict management of the information indicated by the image data corresponding to the transmission document.

Further, the facsimile machine 1 can convert data with color specified according to the color information into monochrome data in response to the presence or absence of the color record capability in the destination apparatus 60 (S57, S62) (S58, S63). Accordingly, the facsimile machine 1 can sufficiently reflect the transmitting user's intention of the transmission document 61 on the record sheet 71 of the destination apparatus 60 regardless of the color record capability of the destination apparatus 60, and can conduct information management intended by the transmitting user.

The facsimile machine 1 can manage the watermark addition timing based on the timer 26 and the mark attachment start date and time data (S6, S123, S124). Accordingly, if importance of the information based on the transmission document 61 varies depending on the timing, the facsimile machine 1 can accomplish information management responsive to importance of the information. Further, to transmit a transmission document, the user need not care the time limit, etc., and can be prevented from forgetting to add a mark leading to erroneous transmission.

If the facsimile machine 1 becomes the destination apparatus 60, it can separate the reception data into the wireless tag data and the image data (S106 to S111). The facsimile machine 1 can combine the watermark data included in the wireless tag data and the image data to generate composite image data (S126) and can record the composite image data on a record sheet 71 (S127). That is, the facsimile machine 1 can output the image data of the transmission document to which a watermark is added as intended by the transmitting user and if the facsimile machine 1 is the destination apparatus 60, information management of the transmission document 61 intended by the transmitting user can be accomplished in the receiving apparatus.

While the present invention has been shown and described with reference to certain exemplary embodiments thereof, it will be understood by those skilled in the art that various changes in form and details may be made therein without departing from the spirit and scope of the invention as defined by the appended claims.

For example, to transmit data corresponding to the transmission document 61 at high speed, the ECM function can be operated only for the wireless tag data and to transmit data corresponding to the transmission document 61 at usual speed, the ECM function can be operated for all data.

The facsimile machine 1 can also be configured to be able to change the watermark data included in the wireless tag data. For example, the date and time indicated by the mark attachment start date and time data can also be displayed on the LCD 18 so as to enable the user to set through the operation panel 17. Since it is necessary to shorten the time occupying the facsimile machine 1 by one user, it is advantageous that the change operation should be simple operation.

In the exemplary embodiment, if the facsimile machine 1 becomes the destination apparatus 60, the watermark image is combined with the image data, but the received wireless tag data can also be stored in the wireless tag 72. Accordingly, the watermark data is written into the wireless tag of the received document. Thus, to further copy the reception document or transmit the reception document by facsimile, the watermark data can be reflected.

Further, in the exemplary embodiment, the transmission document 61 and the wireless tag 62 are associated with each other and the setting of addition of a watermark corresponding to the transmission document 61 is based on the wireless tag data corresponding to the transmission document 61, but the present invention is not limited thereto. For example, it is also possible to apply the wireless tag data (watermark data) of the first one page of the transmission document 61 to all pages of the transmission document 61.

Further, in the description of the exemplary embodiment, the case where a record sheet and a wireless tag are formed in one piece is taken as an example, but the present invention is not limited to the mode. For example, it is also assumed that a record sheet and a wireless tag are separate pieces depending on the configuration of the receiving apparatus. In this case, if image data and its corresponding wireless tag data are received in facsimile reception processing, the image data is recorded on a usual record sheet and the wireless tag data is written into a wireless tag separate from the record sheet.

Such a separate wireless tag may include an adhesion part on the back like a label and may be automatically or manually attached to a record sheet on which the corresponding image data is recorded after the wireless tag data is written. Consequently, the output result with the wireless tag added to the record sheet can also be provided. Likewise, in the transmitting party, a document and a wireless tag need not necessarily be one piece and may be read separately if the correspondence between each page of the document and the wireless tag can be managed.

FIG. 2

14 FLASH MEMORY
15 WIRELESS TAG READER
17 OPERATION PANEL
19 WIRELESS TAG WRITER
20 MODEM
21 BUFFER
22 SCANNER
23 CODING SECTION
24 DECODING SECTION
26 TIMER
27 AMPLIFIER
29 EXCHANGE
30 LASER PRINTER
131 TRANSMISSION FACSIMILE DATA STORAGE AREA
132 TRANSMISSION WIRELESS TAG DATA SIZE STORAGE AREA
133 WIRELESS TAG DATA TRANSMITTABLE FLAG
134 RECEPTION FACSIMILE DATA STORAGE AREA
135 SIZE INFORMATION STORAGE AREA
136 RECEPTION WIRELESS TAG DATA SIZE STORAGE AREA
141 TRANSMISSION DATA RETENTION MEMORY

FIG. 3A

61 FAX TRANSMISSION DOCUMENT
71 FAX TRANSMISSION DOCUMENT

FIG. 3B a. WIRELESS TAG DATA
b. IMAGE DATA

FIG. 4A

152 RECEPTION UNIT
162 TRANSMISSION UNIT
623 RECTIFYING AND SMOOTHING CIRCUIT
624 MODEM CIRCUIT

FIG. 4B

152 RECEPTION UNIT
162 TRANSMISSION UNIT

FIG. 5 a. STORAGE AREA
b. STORAGE CONTENT
c. DATA SIZE (BYTES)
d. UNIQUE ID AREA
e. SYSTEM AREA
f. USER AREA
g. WATERMARK SETTING DATA
h. MARK COMPOSITION DATA
i. MARK ATTACHMENT START DATE AND TIME DATA
j. MARK PRESENCE/ABSENCE SETTING
k. MARK SYNTHESIS SETTING l. DATE LIMIT SETTING
m. CHARACTER STRING
n. FONT
o. SIZE
p. COLOR INFORMATION
q. POSITION INFORMATION X
r. POSITION INFORMATION Y
s. ANGLE INFORMATION
t. CODE TYPE

FIG. 6 a. FAX TRANSMISSION PROCESSING
S1 TRANSMISSION DATA READ PROCESSING
S2 WIRELESS TAG DATA EXISTS?
S3 PERFORM USUAL FAX TRANSMISSION PROCESSING
S4 WATERMARK DATA INCLUDED?
S5 PERFORM OTHER FAX TRANSMISSION PROCESSING
S6 WITHIN ATTACHMENT TIME PERIOD?
S7 COMPOSITE IMAGE DATA IS TO BE TRANSMITTED?
S8 WATERMARK SYNTHESIS AND TRANSMISSION PROCESSING
S9 WATERMARK NON-SYNTHESIS AND TRANSMISSION PROCESSING
S10 PERFORM USUAL FAX TRANSMISSION PROCESSING

FIG. 7 a. TRANSMISSION DATA READ PROCESSING
S11 N=0
S12 N=N+1
S13 WIRELESS TAG DATA IS DETECTED?
S14 STORE WIRELESS TAG DATA
S15 PERFORM IMAGE DATA READ PROCESSING
S16 COMPLETION OF ONE-PAGE READ?
S17 PERFORM DATA CODING PROCESSING
S18 COMPLETION OF ALL-PAGE READ?

FIG. 8 a. WATERMARK SYNTHESIS AND TRANSMISSION PROCESSING
S21 SYNTHESIS FLAG SET?
S22 PERFORM IMAGE DATA DECODING PROCESSING
S23 PERFORM WATERMARK IMAGE SYNTHESIS PROCESSING
S24 PERFORM COMPOSITE IMAGE DATA CODING PROCESSING
S25 COMPLETION OF ALL-PAGE PROCESSING?
S26 PERFORM WATERMARK FAX TRANSMISSION PROCESSING

FIG. 9 a. WATERMARK NON-SYNTHESIS AND TRANSMISSION PROCESSING
S31 NON-SYNTHESIS FLAG SET?
S32 PERFORM WATERMARK FAX TRANSMISSION PROCESSING

FIG. 10 a. WATERMARK FAX TRANSMISSION PROCESSING
S41 DIAL TO DESTINATION
S42 PERFORM FAX TRANSMISSION PREPROCESSING
S43 PERFORM NSF SIGNAL ANALYSIS PROCESSING
S44 NON-STANDARD FUNCTION IS INCLUDED IN DESTINATION APPARATUS?
S45 WIRELESS TAG DATA RECORD CAPABILITY IS INCLUDED IN DESTINATION APPARATUS?
S46 ECM FUNCTION IS INCLUDED IN DESTINATION APPARATUS?
S47 TRANSMIT NSS SIGNAL
S48 PERFORM WIRELESS TAG DATA TRANSMISSION PROCESSING
S61 COLOR TRANSMISSION?
S62 COLOR RECORD CAPABILITY IS INCLUDED IN DESTINATION APPARATUS?
S63 PERFORM MONOCHROME CONVERSION PROCESSING
S64 PERFORM DATA TRANSMISSION PROCESSING
S65 COMPLETION OF ALL-PAGE TRANSMISSION?
S66 PERFORM TRANSMISSION TERMINATION PROCESSING

FIG. 11

S49 SYNTHESIS FLAG STORED?
S50 COMMUNICATION CONTINUATION SETTING
S51 PERFORM COMMUNICATION CANCEL PROCESSING
S52 PERFORM IMAGE DATA DECODING PROCESSING
S53 PERFORM WATERMARK IMAGE SYNTHESIS PROCESSING
S54 PERFORM COMPOSITE IMAGE DATA CODING PROCESSING
S55 COMPLETION OF ALL-PAGE PROCESSING?
S56 COLOR TRANSMISSION?
S57 COLOR RECORD CAPABILITY IS INCLUDED IN DESTINATION APPARATUS?
S58 PERFORM MONOCHROME CONVERSION PROCESSING
S59 PERFORM DATA TRANSMISSION PROCESSING
S60 COMPLETION OF ALL-PAGE TRANSMISSION?

FIG. 12 a. FAX RECEPTION PROCESSING
S101 CALL SIGNAL IS DETECTED?
S102 PERFORM INCOMING CALL PROCESSING
S103 PERFORM FAX RECEPTION PREPROCESSING
S104 TRANSMIT NSF SIGNAL
S105 RECEIVE NSS SIGNAL
S106 WIRELESS TAG DATA IS INCLUDED?
S107 PERFORM WIRELESS TAG DATA RECEPTION PROCESSING
S108 DATA OF PREDETERMINED SIZE IS RECEIVED?
S109 PERFORM IMAGE DATA RECEPTION PROCESSING
S110 COMPLETION OF IMAGE DATA RECEPTION?
S111 COMPLETION OF RECEPTION OF ALL PAGES OF DOCUMENT?
S112 PERFORM RECEPTION TERMINATION PROCESSING
S113 RECEPTION DATA RECORD PROCESSING

FIG. 13 a. RECEPTION DATA RECORD PROCESSING
S121 WIRELESS TAG DATA IS RECEIVED?
S122 WATERMARK DATA IS INCLUDED?

S123 MARK ATTACHMENT START DATE AND TIME DATA IS INCLUDED?
S124 CURRENT DATE AND TIME EXCEEDS MARK ATTACHMENT START DATE AND TIME?
S125 PERFORM WATERMARK IMAGE EXPANSION PROCESSING
S126 PERFORM WATERMARK IMAGE SYNTHESIS PROCESSING
S127 PERFORM COMPOSITE IMAGE DATA RECORD PROCESSING
S128 ERASE ALREADY RECORDED DATA
S129 COMPLETION OF ALL-PAGE RECORDING?
S130 PERFORM IMAGE DATA RECORD PROCESSING

What is claimed is:

1. A communication apparatus comprising:
an image read unit which reads image data from a transmission document;
a tag read unit which wirelessly reads tag data stored in a wireless tag corresponding to the transmission document;
an image data generation unit that generates composite image data by combining the image data and mark image data based on the mark data, if the tag data includes mark data that indicates that a mark is to be added to the image data, the mark data including color specification data indicating a color of the mark;
a transmission unit which transmits the composite image data as transmission document data, to an external apparatus;
a first detection unit, which, before transmitting the transmission document data, detects whether the external apparatus has a color output function; and
a change unit, which changes the color specification data into monochrome specification data indicating a color saturation of the mark based on the mark data if the external apparatus does not have the color output function.

2. The communication apparatus according to claim 1, further comprising:
a second detection unit which, before transmitting the transmission document data, detects whether the external apparatus has a tag data receiving function; and
a transmission controller which controls the transmission unit to transmit the composite image data as the transmission document data to the external apparatus if the external apparatus does not have the tag data receiving function, and controls the transmission unit to transmit, as the transmission document data, the image data and the tag data including the mark data to the external apparatus if the external apparatus has the tag data receiving function.

3. The communication apparatus according to claim 2, further comprising:
a third detection unit which, before transmitting the transmission document data, detects whether the external apparatus has a re-transmission function for requesting re-transmission of the transmission document data if a fault occurs in transmission of the transmission document data; and
a transmission setting unit which sets the re-transmission function to operate at least for transmission of the tag data if the external apparatus has the re-transmission function.

4. The communication apparatus according to claim 3,
wherein the transmission controller controls the transmission unit to stop transmission of the transmission document data if the external apparatus does not have the re-transmission function.

5. The communication apparatus according to claim 1,
wherein the mark data includes term data indicating a term during which the mark is to be added to the image data;
the communication apparatus further comprising:
a time acquisition unit which acquires a current date and time; and
a determination unit which compares the current date and time acquired by the time acquisition unit and the term data and determines whether the mark is to be added to the image data.

6. The communication apparatus according to claim 1,
wherein the mark data includes a position data indicating a position at which the mark is to be added in the image data.

7. The communication apparatus according to claim 1,
wherein the mark is added to the image data as a background image in the composite image data.

8. A communication apparatus comprising:
an image read unit which reads image data from a transmission document;
a tag read unit which wirelessly reads tag data stored in a wireless tag corresponding to the transmission document;
a transmission unit that transmits, as transmission document data, the image data and the tag data to an external apparatus, if the tag data includes mark data that indicates that a mark is to be added to the image data, the mark data including color specification data indicating a color of the mark; and
a first detection unit, which, before transmitting the transmission document data, detects whether the external apparatus has a color output function; and
a change unit, which changes the color specification data into monochrome specification data indicating a color saturation of the mark based on the mark data, if the external apparatus does not have the color output function.

9. The communication apparatus according to claim 8, further comprising:
a second detection unit which, before transmitting the transmission document data, detects whether the external apparatus has a re-transmission function for requesting re-transmission of the transmission document data if a fault occurs in transmission of the transmission document data; and
a transmission setting unit which sets the re-transmission function to operate at least for transmission of the tag data if the external apparatus has the re-transmission function.

10. The communication apparatus according to claim 9,
wherein the transmission controller controls the transmission unit to stop transmission of the transmission document data if the external apparatus does not have the re-transmission function.

11. The communication apparatus according to claim 8,
wherein the mark data includes term data indicating a term during which the mark is to be added to the image data;
the communication apparatus further comprising:
a time acquisition unit which acquires a current date and time; and a determination unit which compares the current date and time acquired by the time acquisition unit and the term data and determines whether the mark is to be added to the image data.

12. The communication apparatus according to claim 8, wherein the transmission unit transmits a data size of the tag data.

13. A communication apparatus comprising:
an image read unit which reads image data from a transmission document;
a tag read unit which wirelessly reads tag data stored in a wireless tag corresponding to the transmission document;
an image data generation unit that generates composite image data by combining the image data and mark image data based on the mark data, if the tag data includes mark data that indicates that a mark is to be added to the image data;
a transmission unit which transmits the composite image data, as transmission document data, to an external apparatus;
a detection unit, which, before transmitting the transmission document data, detects whether the external apparatus has a re-transmission function for requesting re-transmission of the transmission document data, if a fault occurs in transmission of the transmission document data; and
a transmission setting unit which sets the re-transmission function to operate at least for transmission of the transmission document data if the external apparatus has the re-transmission function.

14. The communication apparatus according to claim 13, wherein the transmission controller controls the transmission unit to stop transmission of the transmission document data if the external apparatus does not have the re-transmission function.

15. A communication apparatus comprising:
an image read unit which reads image data from a transmission document;
a tag read unit which wirelessly reads tag data stored in a wireless tag corresponding to the transmission document;
a transmission unit that transmits the image data and the tag data, as transmission document data, to an external apparatus if the tag data includes mark data indicating that a mark is to be added to the image data;
a detection unit, which, before transmitting the transmission document data, detects whether the external apparatus has a re-transmission function for requesting re-transmission of the transmission document data, if a fault occurs in transmission of the transmission document data; and
a transmission setting unit, which sets the re-transmission function to operate at least for transmission of the tag data, if the external apparatus has the re-transmission function.

16. The communication apparatus according to claim 15, wherein the transmission controller controls the transmission unit to stop transmission of the transmission document data if the external apparatus does not have the re-transmission function.

* * * * *